US011535082B2

(12) United States Patent
Nagahama et al.

(10) Patent No.: US 11,535,082 B2
(45) Date of Patent: Dec. 27, 2022

(54) VEHICLE AIR-CONDITIONING CONTROL SYSTEM, VEHICLE AIR-CONDITIONING SYSTEM, AND CONTROLLER

(71) Applicant: DENSO CORPORATION, Kariya (JP)

(72) Inventors: Marie Nagahama, Kariya (JP); Yasuhiko Niimi, Kariya (JP)

(73) Assignee: DENSO CORPORATION, Kariya (JP)

( * ) Notice: Subject to any disclaimer, the term of this patent is extended or adjusted under 35 U.S.C. 154(b) by 58 days.

(21) Appl. No.: 17/146,970

(22) Filed: Jan. 12, 2021

(65) Prior Publication Data

US 2021/0129624 A1 May 6, 2021

Related U.S. Application Data

(63) Continuation of application No. PCT/JP2019/026694, filed on Jul. 4, 2019.

(30) Foreign Application Priority Data

Aug. 6, 2018 (JP) .............................. JP2018-147765

(51) Int. Cl.
*B60H 1/00* (2006.01)
*B60H 1/32* (2006.01)

(52) U.S. Cl.
CPC ..... *B60H 1/00742* (2013.01); *B60H 1/00285* (2013.01); *B60H 1/00792* (2013.01); *B60H 2001/003* (2013.01); *B60H 2001/3236* (2013.01)

(58) Field of Classification Search
CPC ............ B60H 1/00742; B60H 1/00871; B60H 1/00285; B60H 1/00792; B60H 2001/003; B60H 2001/3236
See application file for complete search history.

(56) References Cited

U.S. PATENT DOCUMENTS

| | | | | |
|---|---|---|---|---|
| 2008/0256967 | A1* | 10/2008 | Errington | B60H 1/00742 62/244 |
| 2015/0017902 | A1 | 1/2015 | Sakurai et al. | |
| 2019/0359028 | A1 | 11/2019 | Hashimoto et al. | |
| 2021/0213801 | A1* | 7/2021 | Nagahama | B60H 1/242 |

FOREIGN PATENT DOCUMENTS

| | | |
|---|---|---|
| JP | 2000219040 A | 8/2000 |
| JP | 2018090200 A | 6/2018 |
| JP | 2018131196 A | 8/2018 |
| WO | WO-2013145172 A1 | 10/2013 |
| WO | WO-2018150805 A1 | 8/2018 |

* cited by examiner

*Primary Examiner* — Marc E Norman

(74) *Attorney, Agent, or Firm* — Harness, Dickey & Pierce, P.L.C.

(57) ABSTRACT

A vehicle air-conditioning control system includes a controller that controls a blow outlet drive device and a plate member drive device based on a sensed result of a seat back state sensing device. When a reclined state of the seat back is sensed, the controller controls the blow outlet drive device and thereby places an air-flow direction change mechanism in a predetermined position to direct conditioning air, which is blown from the blow outlet, such that the conditioning air collides to a plate surface of a plate member. At this time, the controller also controls the plate member drive device to place the plate member in a predetermined position, so that the conditioning air, which collides to the plate surface of the plate member, reaches a specific part of an occupant who is on the seat having the seat back placed in the reclined state.

21 Claims, 7 Drawing Sheets

VEHICLE FRONT-TO-REAR DIRECTION

VEHICLE WIDTH DIRECTION

VEHICLE AIR-CONDITIONING CONTROL SYSTEM, VEHICLE AIR-CONDITIONING SYSTEM, AND CONTROLLER

CROSS REFERENCE TO RELATED APPLICATIONS

This application is a continuation application of International Patent Application No. PCT/JP2019/026694 filed on Jul. 4, 2019, which designated the U.S. and claims the benefit of priority from Japanese Patent Application No. 2018-147765 filed on Aug. 6, 2018. The entire disclosures of all of the above applications are incorporated herein by reference.

TECHNICAL FIELD

The present disclosure relates to a vehicle air-conditioning control system, a vehicle air-conditioning system, and a controller.

BACKGROUND

Previously, there is proposed an apparatus that changes a direction of a blow outlet of a blower device, which is installed at a room mirror of a vehicle, based on an angle of a seat back sensed with a position sensor, so that the air is blown from the blow outlet to a predetermined part of an occupant regardless of the angle of the seat back.

SUMMARY

This section provides a general summary of the disclosure, and is not a comprehensive disclosure of its full scope or all of its features.

According to the present disclosure, there may be provided a vehicle air-conditioning system for a vehicle. The vehicle air-conditioning system includes a seat, an air conditioner, a blow outlet, an air-flow direction change mechanism, a seat back state sensing device and a plate member. The seat is located in a vehicle cabin. The air conditioner is configured to generate conditioning air. The blow outlet is located at an instrument panel and is configured to blow the conditioning air, which is generated from the air conditioner, into the vehicle cabin. The air-flow direction change mechanism is configured to change a flow direction of the conditioning air, which is blown from the blow outlet, in a vertical direction. The seat back state sensing device is configured to sense a state of a seat back of the seat. The plate member is installed at a vehicle cabin ceiling and is operable between: a normal state where a plate surface of the plate member is placed along the vehicle cabin ceiling; and a projecting state where the plate surface of the plate member projects into the vehicle cabin. When a reclined state of the seat back is sensed with the seat back state sensing device, the air-flow direction change mechanism is placed in a predetermined position of the air-flow direction change mechanism to direct the conditioning air, which is blown from the blow outlet, such that the conditioning air collides to the plate surface of the plate member. At this time, the plate member is placed in a predetermined position of the plate member, so that the conditioning air, which collides to the plate surface of the plate member, is directed to and reaches a specific part of an occupant who is on the seat having the seat back placed in the reclined state.

There may be additionally provided a controller and at least one of a blow outlet drive device and a plate member drive device. The blow outlet drive device is configured to drive the air-flow direction change mechanism. The plate member drive device is configured to drive the plate member. The controller is configured to control the at least one of the blow outlet drive device and the plate member drive device.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
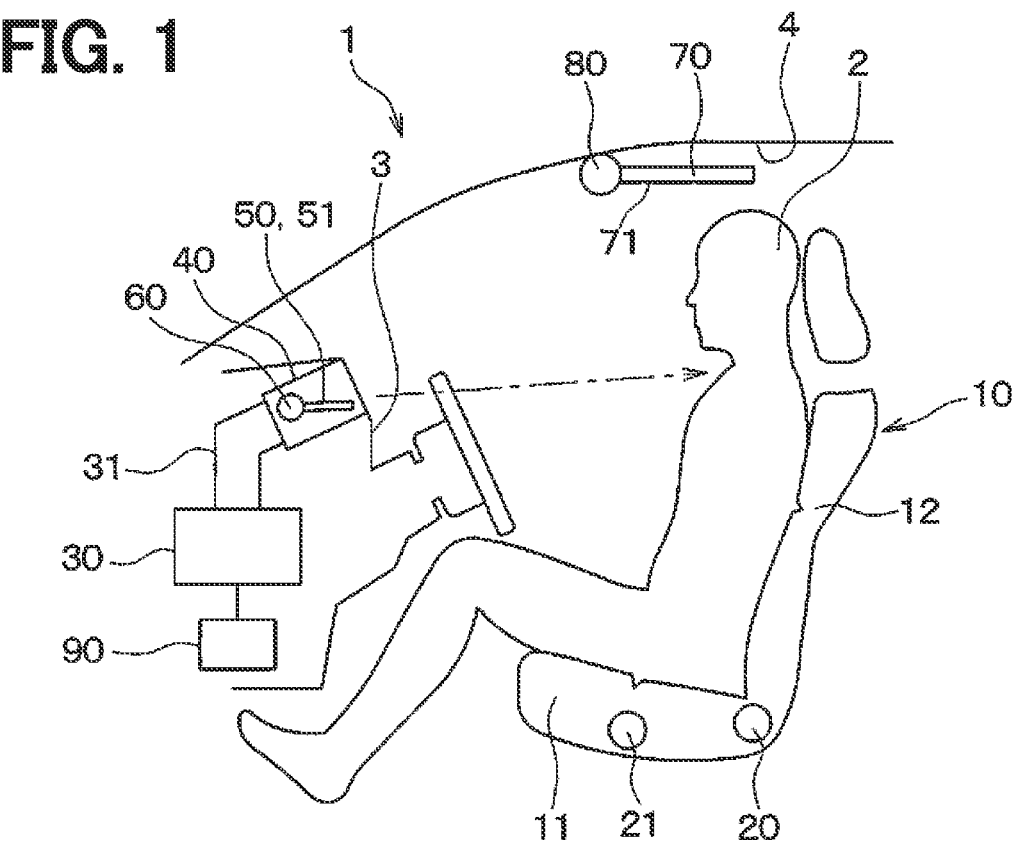
FIG. 1 is a schematic view of a vehicle that has a vehicle air-conditioning control system according to a first embodiment, showing a state where a seat back is in an upright state.

Previously, there is proposed an apparatus that changes a direction of a blow outlet of a blower device, which is installed at a room mirror of a vehicle, based on an angle of a seat back sensed with a position sensor, so that the air is blown from the blow outlet to a predetermined part of an occupant regardless of the angle of the seat back.

In an ordinary vehicle air-conditioning system, the air is blown from a face blow outlet located at an instrument panel to an upper body of the occupant. In a case of an imaginary vehicle air-conditioning system where the idea of the previously proposed blower device is applied to the vehicle air-conditioning system described above, a flow direction of the air blown from the face blow outlet can be changed based on the angle of the seat back.

In a case where the air is applied to a chest of the occupant regardless of the angle of the seat back, the previously proposed apparatus can easily apply the air to the chest of the occupant even in the reclined state of the seat back since the location of the blow outlet is high at or around a ceiling of a vehicle cabin. However, in the case of the previously proposed apparatus, it is required to place a duct from an air conditioner, which is placed at an inside of the instrument panel, to the ceiling, or it is required to provide a blower device separately from the blower of the air conditioner.

In the imaginary vehicle air-conditioning system, the above disadvantage can be avoided since the face blow outlet is located at the instrument panel. However, in the imaginary vehicle air-conditioning system, since the position of the blow output is lower than that of the previously proposed apparatus, the air, which is blown from the face blow outlet, flows along the body of the occupant when the seat back is in the reclined state. Therefore, the air, which is blown toward the chest of the occupant, flows to the face of the occupant after passing through the chest, and thereby the occupant will have annoying feeling.

As discussed above, the inventors of the present application have found that there is the new disadvantage of that the air, which is blown from the face blow outlet in the reclined state of the seat back, flows along the body of the occupant and reaches the face of the occupant to cause the annoying feeling, and this new disadvantage is not previously found.

According to one aspect of the present disclosure, there is provided a vehicle air-conditioning control system for a vehicle while the vehicle includes:

a seat that is located in a vehicle cabin;

an air conditioner that is configured to generate conditioning air;

a blow outlet that is located at an instrument panel and is configured to blow the conditioning air, which is generated from the air conditioner, into the vehicle cabin;

an air-flow direction change mechanism that is configured to change a flow direction of the conditioning air, which is blown from the blow outlet, in a vertical direction;

a blow outlet drive device that is configured to drive the air-flow direction change mechanism; and a seat back state sensing device that is configured to sense a state of a seat back of the seat, the vehicle air-conditioning control system including:

a controller that is configured to control the blow outlet drive device based on a sensed result of the seat back state sensing device, wherein:

the vehicle includes:

a plate member that is installed at a vehicle cabin ceiling and is operable between:

a normal state where a plate surface of the plate member is placed along the vehicle cabin ceiling; and a projecting state where the plate surface of the plate member projects into the vehicle cabin; and a plate member drive device that is configured to drive the plate member; and when a reclined state of the seat back is sensed with the seat back state sensing device, the controller controls the blow outlet drive device and thereby places the air-flow direction change mechanism in a predetermined position of the air-flow direction change mechanism to direct the conditioning air, which is blown from the blow outlet, such that the conditioning air collides to the plate surface of the plate member, and at this time, the controller also controls the plate member drive device to place the plate member in a predetermined position of the plate member, so that the conditioning air, which collides to the plate surface of the plate member, is directed to and reaches a specific part of an occupant who is on the seat having the seat back placed in the reclined state.

With the above configuration, when a reclined state of the seat back is sensed with the seat back state sensing device, the controller controls the blow outlet drive device and thereby places the air-flow direction change mechanism in the predetermined position thereof, and the controller also controls the plate member drive device and thereby places the plate member in the predetermined position thereof. Therefore, the conditioning air, which is blown from the face blow outlet of the instrument panel, collides to the plate surface of the plate member, and then the conditioning air changes the flow direction thereof along the plate surface of the plate member and reaches the specific part (e.g., a chest or a neck) of the occupant on the seat that has the seat back placed in the reclined state. Therefore, when the occupant is in a reclined posture, the vehicle air-conditioning control system can apply the conditioning air, which is blown from the blow outlet of the instrument panel, to the specific part of the occupant to enhance the comfort of the occupant. Also, the vehicle air-conditioning control system can limit the conditioning air, which is blown from the blow outlet of the instrument panel, to reach a face of the occupant after flowing along the body of the occupant, so that it is possible to limit annoying feeling of the occupant.

In the present description, the predetermined position of the air-flow direction change mechanism is defined as a position of the air-flow direction change mechanism that is set such that the conditioning air, which is guided by the air-flow direction change mechanism and is blown from the blow outlet, collides to the plate surface of the plate member.

Furthermore, in the present disclosure, the predetermined position of the plate member is defined as a position of the plate member that is set such that the conditioning air, which is guided by the plate surface of the plate member, is directed to and reaches the specific part of the occupant on the seat having the seat back placed in the reclined state.

In the following description, the one aspect of the present disclosure will be referred to as a first aspect of the present disclosure.

According to another aspect of the present disclosure, there is provided a vehicle air-conditioning control system for a vehicle while the vehicle includes:

a seat that is located in a vehicle cabin;

an air conditioner that is configured to generate conditioning air;

a blow outlet that is located at an instrument panel and is configured to blow the conditioning air, which is generated from the air conditioner, into the vehicle cabin;

an air-flow direction change mechanism that is configured to change a flow direction of the conditioning air, which is blown from the blow outlet, in a vertical direction;

a plate member that is installed at a vehicle cabin ceiling and is operable between:

a normal state where a plate surface of the plate member is placed along the vehicle cabin ceiling; and a projecting state where the plate surface of the plate member projects into the vehicle cabin; and a seat back state sensing device that is configured to sense a state of a seat back of the seat, wherein:

one of the air-flow direction change mechanism and the plate member is configured to be driven by an actuator, and another one of the air-flow direction change mechanism and the plate member is configured to be driven manually by an occupant;

the another one of the air-flow direction change mechanism and the plate member is configured to enable the occupant to determine placement of the another one of the air-flow direction change mechanism and the plate member in a predetermined position of the another one of the air-flow direction change mechanism and the plate member with one of a visual sense, an auditory sense and a tactile sense of the occupant;

the vehicle air-conditioning control system comprising a controller that is configured to control the actuator based on a sensed result of the seat back state sensing device, wherein:

when a reclined state of the seat back is sensed with the seat back state sensing device, the controller controls the actuator and thereby places the one of the air-flow direction change mechanism and the plate member in a predetermined position of the one of the air-flow direction change mechanism and the plate member, and at this time, when the another one of the air-flow direction change mechanism and the plate member is placed in the predetermined position of the another one of the air-flow direction change mechanism and the plate member, the conditioning air, which is blown from the blow outlet, collides to the plate surface of the plate member and thereafter reaches a specific part of the occupant who is on the seat having the seat back placed in the reclined state.

In the following description, the another aspect of the present disclosure will be referred to as a second aspect of the present disclosure.

With the above configuration, when the seat back is placed in the reclined state, the controller drives the actuator and thereby places the one of the air-flow direction change mechanism and the plate member in the predetermined position thereof. The occupant can manually drive the another one of the air-flow direction change mechanism and the plate member and can determine placement of the another one of the air-flow direction change mechanism and the plate member in the predetermined position thereof with the one of the visual sense, the auditory sense and the tactile sense of the occupant. In such a case, the conditioning air, which is blown from the blow outlet of the instrument panel, collides to the plate surface of the plate member, and then the conditioning air changes the flow direction thereof along the plate surface of the plate member and reaches the specific part of the occupant on the seat. Therefore, the second aspect of the present disclosure can also achieve the effects and advantages which are the same as those of the first aspect of the present disclosure. Furthermore, according the second aspect of the present disclosure, the actuator (the drive device), which drives the another one of the air-flow direction change mechanism and the plate member, is eliminated to simplify the structure in comparison to the first aspect of the present disclosure.

According to a further aspect of the present disclosure, there is provided a vehicle air-conditioning system for a vehicle, comprising:

a seat that is located in a vehicle cabin;

an air conditioner that is configured to generate conditioning air;

a blow outlet that is located at an instrument panel and is configured to blow the conditioning air, which is generated from the air conditioner, into the vehicle cabin;

an air-flow direction change mechanism that is configured to change a flow direction of the conditioning air, which is blown from the blow outlet, in a vertical direction; and a plate member that is installed at a vehicle cabin ceiling and is operable between:

a normal state where a plate surface of the plate member is placed along the vehicle cabin ceiling; and a projecting state where the plate surface of the plate member projects into the vehicle cabin, wherein:

each of the air-flow direction change mechanism and the plate member is configured to enable an occupant to determine placement of each of the air-flow direction change mechanism and the plate member in a predetermined position of each of the air-flow direction change mechanism and the plate member with one of a visual sense, an auditory sense and a tactile sense of the occupant; and the air-flow direction change mechanism and the plate member are configured such that in a state where a seat back of the seat is in a reclined state, and each of the air-flow direction change mechanism and the plate member is in the predetermined position of each of the air-flow direction change mechanism and the plate member, the conditioning air, which is blown from the blow outlet, collides to the plate surface of the plate member and thereafter reaches a specific part of the occupant who is on the seat having the seat back placed in the reclined state.

In the following description, the further aspect of the present disclosure will be referred to as a third aspect of the present disclosure.

With the above configuration, the occupant can determine placement of each of the air-flow direction change mechanism and the plate member in the predetermined position thereof with the one of the visual sense, the auditory sense and the tactile sense of the occupant. Therefore, when the occupant places each of the air-flow direction change mechanism and the plate member in the predetermined position thereof, the conditioning air, which is blown from the blow outlet of the instrument panel, collides to the plate surface of the plate member, and then the conditioning air changes the flow direction thereof along the plate surface of the plate member and reaches the specific part of the occupant on the seat having the seat back placed in the reclined state. Therefore, the third aspect of the present disclosure can also achieve the effects and advantages which are the same as those of the second aspect of the present disclosure. Furthermore, according the third aspect of the present disclosure, the actuators (the drive devices), which respectively drive the air-flow direction change mechanism and the plate member, are eliminated to simplify the structure in comparison to the first aspect of the present disclosure.

According to an additional aspect of the present disclosure, there is provided a controller for air conditioning of a vehicle while the vehicle includes:

a seat that is located in a vehicle cabin;

an air conditioner that is configured to generate conditioning air;

a blow outlet that is located at an instrument panel and is configured to blow the conditioning air, which is generated from the air conditioner, into the vehicle cabin;

an air-flow direction change mechanism that is configured to change a flow direction of the conditioning air, which is blown from the blow outlet, in a vertical direction; and a blow outlet drive device that is configured to drive the air-flow direction change mechanism; and a seat back state sensing device that is configured to sense a state of a seat back of the seat;

a plate member that is installed at a vehicle cabin ceiling and is operable between:
  a normal state where a plate surface of the plate member is placed along the vehicle cabin ceiling; and
  a projecting state where the plate surface of the plate member projects into the vehicle cabin; and
a plate member drive device that is configured to drive the plate member, wherein:
  when a reclined state of the seat back is sensed with the seat back state sensing device, the controller controls the blow outlet drive device and thereby places the air-flow direction change mechanism in a predetermined position of the air-flow direction change mechanism to direct the conditioning air, which is blown from the blow outlet, such that the conditioning air collides to the plate surface of the plate member, and
  at this time, the controller also controls the plate member drive device to place the plate member in a predetermined position of the plate member, so that the conditioning air, which collides to the plate surface of the plate member, reaches a specific part of an occupant who is on the seat having the seat back placed in the reclined state.

In the following description, the additional aspect of the present disclosure will be referred to as a fourth aspect of the present disclosure.

Therefore, the fourth aspect of the present disclosure can also achieve the effects and advantages which are the same as those of the first aspect of the present disclosure.

Hereinafter, embodiments of the present disclosure will be described with reference to the drawings. In each of the following embodiments, the same or equivalent parts are indicated by the same reference signs, and the description thereof will be omitted.

First Embodiment

A first embodiment will be described with reference to FIGS. 1 to 3. A vehicle air-conditioning control system of the present embodiment is applied to a vehicle 1 on which an occupant rides, and the vehicle air-conditioning control system controls corresponding respective devices of the vehicle 1 by a controller 90. The vehicle 1, in which the vehicle air-conditioning control system of the present embodiment is applied, may include an autonomous vehicle, in which an automatic driving system performs all the driving operations such as acceleration, steering, braking, and surrounding monitoring, in addition to a vehicle, in which the occupant 2 performs the driving operation. In the case of the autonomous vehicle, it is possible for the occupant to get on the vehicle with a seat back tilted backward, i.e., reclined (hereinafter referred to as "reclined state") while the vehicle is running.

First, the vehicle 1, to which the vehicle air-conditioning control system is applied, will be described.

Figure 2:
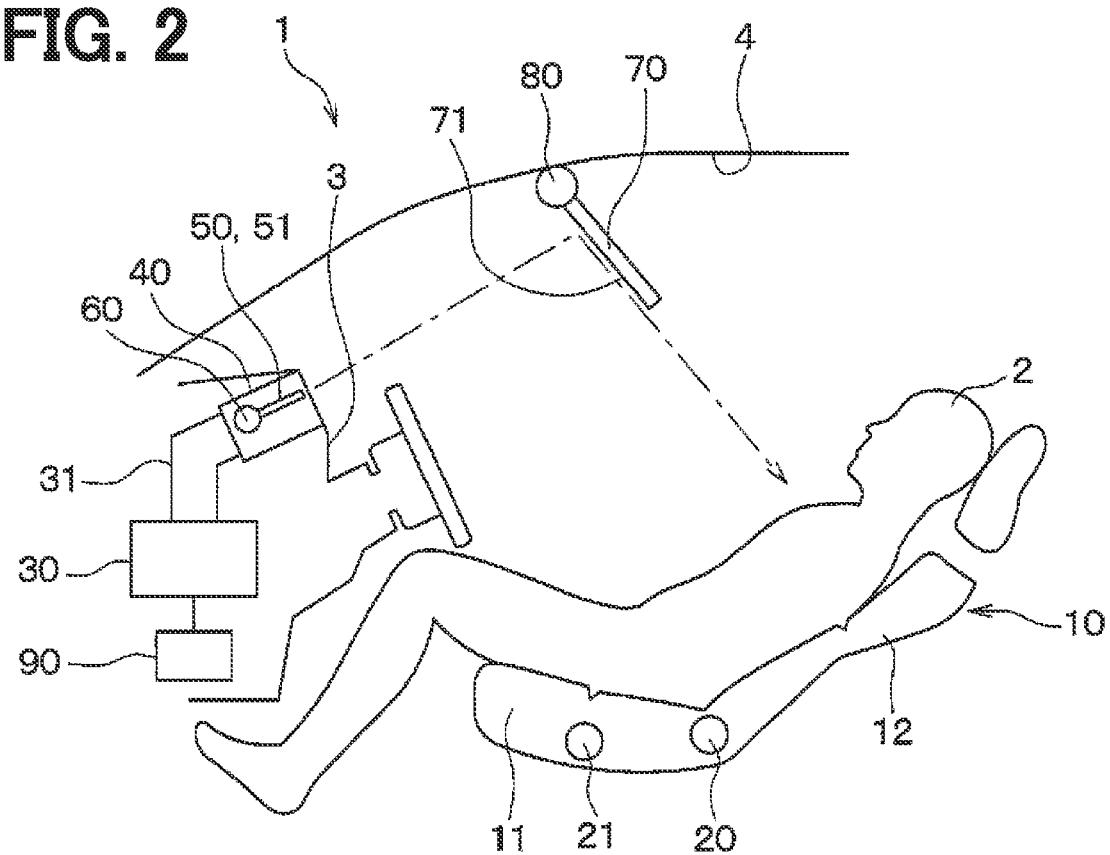
FIG. 2 is a schematic view of the vehicle that has the vehicle air-conditioning control system according to the first embodiment, showing a state where the seat back is in a reclined state.
Figure 3:
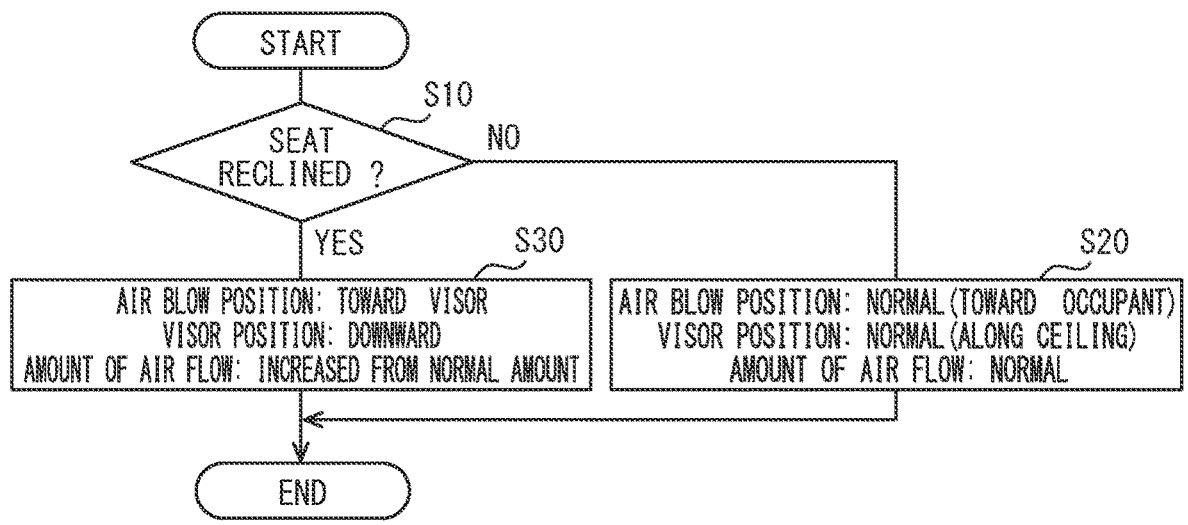
FIG. 3 is a flowchart of a control process executed by a controller of the vehicle air-conditioning control system according to the first embodiment.

As shown in FIGS. 1 and 2, the vehicle 1 includes a seat 10, a seat back state sensing device 20, an air conditioner 30, a face blow outlet (serving as a blow outlet) 40, an air-flow direction change mechanism 50, a first actuator (serving as a blow outlet drive device) 60, a plate member 70 and a second actuator (serving as a plate member drive device) 80.

The seat 10 is located in a vehicle cabin. The seat 10 includes: a seat cushion 11, which supports buttocks of the occupant 2; and a seat back 12, which supports a back of the occupant 2. The seat back 12 is configured such that an angle of the seat back 12 relative to the seat cushion 11 is changeable. Further, the seat 10 is configured such that the seat 10 is movable relative to a vehicle cabin floor surface in a vehicle front-to-rear direction.

A state of the seat back 12 of the seat 10 is sensed with a seat back state sensing device 20. The seat back state sensing device 20 includes, for example, an angle sensor, which senses an angle of the seat back 12 relative to the seat cushion 11, an in-vehicle camera, which captures an image of the seat 10 or the occupant 2 on the seat 10, or a rotational angle sensor, which senses a rotational angle of an electric motor that drives the seat back 12. Information, which is sensed with the seat back state sensing device 20, is transmitted to the controller 90. Alternatively, in a case where a sleep switch for putting the seat back 12 in the reclined state is provided, the sleep switch may be used as the seat back state sensing device 20. In that case, information on whether or not the sleep switch is turned on is transmitted to the controller 90. The controller 90 determines whether the seat back 12 is in the upright state or the reclined state based on the information transmitted from the seat back state sensing device 20.

Furthermore, a position of the seat cushion 11 in the vehicle front-to-rear direction is sensed by a seat front-to-rear position sensing device 21. The seat front-to-rear position sensing device 21 includes, for example, a position sensor, which senses the position of the seat cushion 11, an in-vehicle camera, which captures an image of the seat 10 or the occupant 2 on the seat 10, or a rotational angle sensor, which senses a rotational angle of an electric motor that drives the seat cushion 11 in the vehicle front-to-rear direction. Information, which is sensed with the seat front-to-rear position sensing device 21, is transmitted to the controller 90.

The air conditioner 30 is placed at an inside of an instrument panel 3. The air conditioner 30 includes a blower, a cooler, a heater and the like, which are placed at an inside of an air conditioner case, and the outside air of the vehicle and/or the inside air of the vehicle is taken into the inside of the air conditioner case to generate conditioning air, the temperature and the humidity of which are adjusted. The conditioning air, which is generated by the air conditioner 30, is blown into the vehicle cabin from the face blow outlet 40 located at the instrument panel 3 through a duct 31. The face blow outlet 40 is configured to blow the conditioning air mainly toward the upper body of the occupant 2 and its surroundings. In addition to the face blow outlet 40, the vehicle 1 has a defroster blow outlet, a foot blow outlet, and the like as outlets for blowing out the conditioning air generated by the air conditioner 30.

The air-flow direction change mechanism 50, which changes the flow direction of the conditioning air blown from the face blow outlet 40 located at the instrument panel 3, is provided to the face blow outlet 40. The air-flow direction change mechanism 50 of the present embodiment is a guide fin 51 that adjusts the flow direction of the conditioning air at the inside of the face blow outlet 40. The guide fin 51 can change the flow direction of the conditioning air, which is blown from the face blow outlet 40, in the vertical direction. Alternatively, the guide fin 51 may be a guide fin that can change the flow direction of the conditioning air, which is blown from the face blow outlet 40, in the left-to-right direction. The guide fin 51 of the present embodiment is configured such that the conditioning air, which is blown from the face blow outlet 40, can be directed not only to the upper body of the occupant 2 and its surroundings but also to the plate member 70.

The guide fin 51 is driven by the first actuator (serving as the blow outlet drive device) 60. An operation of the first actuator 60 is controlled by the controller 90. The first actuator 60 for the guide fin 51 can adjust a position or an angle of the guide fin 51 to any corresponding position or any corresponding angle and hold the adjusted position or the adjusted angle.

The plate member 70 is installed to a vehicle cabin ceiling 4 of the vehicle 1. In the present embodiment, the plate member 70 is a sun visor that blocks the sunlight shining into the vehicle cabin from a window glass of the vehicle. The plate member 70 is on a rear side of the face blow outlet 40 and on a front side of a head of the occupant 2 on the seat 10 in the vehicle front-to-rear direction. Furthermore, the plate member 70 is operable between: a normal state where a plate surface 71 of the plate member 70 is placed along the vehicle cabin ceiling 4; and a projecting state where the plate surface 71 of the plate member 70 projects into the vehicle cabin. FIG. 1 indicates the normal state of the plate member 70, and FIG. 2 indicates the projecting state of the plate member 70.

As described above, in the present embodiment, the guide fin 51, which is installed at the face blow outlet 40, can direct the conditioning air, which is blown from the face blow outlet 40, to the plate member 70. As indicated by a dot-dash arrow in FIG. 2, when the conditioning air, which is blown from the face blow outlet 40, collides to the plate surface 71 of the plate member 70 placed in the projecting state, the conditioning air is guided by the plate surface 71 of the plate member 70 and thereby changes the flow direction thereof. Thus, the plate member 70 can be said to be a guide member that guides the conditioning air, which collides to the plate surface 71 of the plate member 70, to change the flow direction of the conditioning air blown from the face blow outlet 40.

In the present embodiment, the plate member 70 is the sun visor. However, the plate member 70 should not be limited to the sun visor. In place of or in addition to the sun visor, the plate member 70 may include a dedicated guide member that is configured to change the flow direction of the conditioning air.

The plate member 70 is driven by the second actuator (serving as the plate member drive device) 80. An operation of the second actuator 80 is controlled by the controller 90. The second actuator 80 for the plate member 70 can adjust a position or an angle of the plate member 70 to any corresponding position or any corresponding angle and hold the adjusted position or the adjusted angle.

Next, the controller 90 of the vehicle air-conditioning control system according to the present embodiment will be described.

The controller 90 is a well-known microcomputer including a CPU, a ROM, a RAM and a peripheral circuit thereof. A storage device of the controller 90 is a non-transitory computer-readable storage medium. The controller 90 of the present embodiment receives information which is sensed by the seat back state sensing device 20 and the seat front-to-rear position sensing device 21. The controller 90 performs various calculations and processes based on a control program stored in the ROM or the like, and the controller 90 controls the operations of the first actuator 60 for the guide fin 51, the second actuator 80 for the plate member 70, the blower of the air conditioner 30, and the like. The controller 90 may be formed integrally with or provided separately from the controller 90 of the air conditioner 30.

A control process, which is executed by the controller 90 of the vehicle air-conditioning control system of the present embodiment, will be described with reference to a flowchart shown in FIG. 3.

This control process starts when an ignition key of the vehicle 1 is turned on. Alternatively, in the case where the vehicle 1 is the autonomous vehicle, the control process starts when a vehicle drive switch is turned on.

At step S10, the controller 90 determines whether the seat back 12 is in the upright state or in the reclined state based on the information transmitted from the seat back state sensing device 20. Specifically, in the case where the seat back state sensing device 20 is the angle sensor or the rotational angle sensor described above, the controller 90 compares the information about the tilt angle of the seat back 12, which is transmitted from the angle sensor or the rotational angle sensor, and a threshold, which is prestored in the controller 90. Then, the controller 90 determines whether the seat back 12 is in the upright state or the reclined state based on a result of the comparison. Alternatively, in the case where the seat back state sensing device 20 is the in-vehicle camera, the controller 90 analyzes an image captured by the in-vehicle camera and determines whether the seat back 12 is in the upright state or the reclined state based on a result of the analysis of the captured image. Further alternatively, in the case where the seat back state sensing device 20 is the sleep switch, the controller 90 determines whether the sleep switch is turned on or not and thereafter determines whether the seat back 12 is in the upright state or the reclined state based on a result of the determination about the sleep switch. When it is determined that the seat back 12 is in the upright state (i.e., the seat reclining determination at step S10: NO), the controller 90 proceeds to step S20.

At step S20, the controller 90 controls the first actuator 60 for the guide fin 51 such that the conditioning air, which is blown from the face blow outlet 40, is directed to the upper body of the occupant 2 and its surroundings, as shown in FIG. 1 (i.e., an air blow position of the face blow outlet 40 is in a normal air blow position for blowing the conditioning air toward the occupant). The position of the guide fin 51 can be arbitrarily changed through operation of the occupant 2.

At step S20, the controller 90 controls the second actuator 80 for the plate member 70 such that the plate member 70 is placed in the normal state where the plate surface 71 of the plate member 70 is placed along the vehicle cabin ceiling 4 (i.e., the plate surface 71 of the plate member 70 is placed in a normal position). The position of the plate member 70 can be arbitrarily changed through the operation of the occupant 2. Therefore, when the seat back 12 is in the upright state, the occupant 2 can block the sunlight by using the plate member 70.

Furthermore, at step S20, the controller 90 sets the flow rate of the conditioning air, which is blown from the face blow outlet 40, based on the set temperature, the vehicle cabin temperature and the amount of solar radiation, and the like. In the following description, the flow rate of the conditioning air, which is set in the upright state of the seat back 12, will be referred to as a normal flow rate (i.e., the amount of the air flow is the normal amount in the upright state of the seat back 12). The flow rate of the conditioning air can be arbitrarily changed through the operation of the occupant 2.

In contrast, when it is determined that the seat back 12 is in the reclined state at step S10 (i.e., the seat reclining determination at step S10: YES), the controller 90 proceeds to step S30. At step S30, the controller 90 controls the first actuator 60 for the guide fin 51 such that the guide fin 51 is placed in a predetermined position of the guide fin 51, as shown in FIG. 2. The predetermined position of the guide fin 51 is defined as a position that is set such that the conditioning air, which is guided by the guide fin 51 and is blown from the face blow outlet 40, collides to the plate surface 71 of the plate member 70 (i.e., the air blow position of the face blow outlet 40 is in a predetermined air blow position for blowing the conditioning air toward the plate member 70). Therefore, the controller 90 controls the first actuator 60 for the guide fin 51 such that the conditioning air, which is blown from the face blow outlet 40, collides to the plate surface 71 of the plate member 70.

Furthermore, at step S30, the controller 90 controls the second actuator 80 for the plate member 70 such that the plate member 70 is placed in the projecting state where the plate surface 71 of the plate member 70 projects into the vehicle cabin (i.e., the plate surface of the plate member 70 projects downward). Specifically, the controller 90 controls the second actuator 80 for the plate member 70 such that the plate member 70 is placed in a predetermined position of the plate member 70. The predetermined position of the plate member 70 is defined as a position that is set such that the conditioning air, which is guided by the plate surface 71 of the plate member 70, is directed to and reaches a specific part of the occupant 2 on the seat 10 having the seat back 12 placed in the reclined state.

The predetermined position of the plate member 70 may be a position that is prestored in the controller 90.

Alternatively, based on the information transmitted from the seat back state sensing device 20 or the seat front-to-rear position sensing device 21, the controller 90 may set the predetermined position of the plate member 70 such that the conditioning air is applied to the specific part of the occupant on the seat 10. The position of the plate member 70 can be arbitrarily changed through the operation of the occupant 2. As a result, the occupant 2 can set the specific part, to which the conditioning air reaches, to a desired position.

Furthermore, at step S30, the controller 90 controls the air conditioner 30 such that the flow rate of the conditioning air, which is blown from the face blow outlet 40, is increased (e.g., increased by 20%) from the normal flow rate described above (i.e., the amount of the air flow is increased from the normal amount). The amount of increase in the flow rate, which is increased by the controller 90, is preset based on, for example, experiments, and is stored in the storage device of the controller 90. Thus, even in the case where the conditioning air is delivered from the face blow outlet 40 to the occupant 2 via the plate member 70, it is possible to deliver the conditioning air, the flow rate of which is close to the flow rate of the conditioning air delivered in the upright state of the seat back 12.

As described above, the vehicle air-conditioning control system of the present embodiment provides the following effects and advantages. Specifically, in the vehicle air-conditioning control system, when the reclined state of the seat back 12 is sensed, the controller 90 controls the first actuator 60 to place the guide fin 51 in the predetermined position thereof and controls the second actuator 80 to place the plate member 70 in the predetermined position thereof. Thus, the conditioning air, which is blown from the face blow outlet 40 of the instrument panel 3, collides to the plate surface 71 of the plate member 70, and then the conditioning air changes the flow direction thereof along the plate surface 71 of the plate member 70 and reaches the specific part of the occupant 2 on the seat 10 having the seat back 12 placed in the reclined state. Therefore, in both of the upright posture and the reclined posture of the occupant 2, the vehicle air-conditioning control system can apply the conditioning air, which is blown from the face blow outlet 40 of the instrument panel 3, to the same specific part of the occupant 2 to enhance the comfort of the occupant 2. Also, the vehicle air-conditioning system can limit the conditioning air, which is blown from the face blow outlet 40 of the instrument panel 3, to reach a face of the occupant 2 after flowing along the body of the occupant 2, so that it is possible to limit annoying feeling of the occupant 2.

Further, the present embodiment should not be limited to the disclosure about the control operation executed by the vehicle air-conditioning control system but can be regarded as the disclosure about the controller 90 that executes the control operation. This controller 90 also achieves the same effects and advantages as those of the vehicle air-conditioning control system described above.

Further, the present embodiment should not be limited to the disclosure about the control operation executed by the vehicle air-conditioning control system but can be regarded as the disclosure about the vehicle air-conditioning system. This vehicle air-conditioning system includes the seat 10, the seat back state sensing device 20, the air conditioner 30, the face blow outlet 40, the air-flow direction change mechanism 50, the blow outlet drive device, the plate member 70, the plate member drive device and the controller 90. The disclosure of this vehicle air-conditioning system also achieves the same effects and advantages as those of the vehicle air-conditioning control system described above.

First Modification of First Embodiment

A first modification of the first embodiment will be described. The first modification is a modification of the operation method of the plate member 70 with respect to the first embodiment, and the rest of the modification is the same as that of the first embodiment. Therefore, only the differences, which are different from the first embodiment, will be described.

In the first modification, the plate member 70 is configured to be manually operated by the occupant 2. In contrast, the guide fin 51, which serves as the air-flow direction change mechanism 50, is driven by the first actuator 60 like in the first embodiment.

The occupant 2 can determine the placement of the plate member 70 in the predetermined position with one of a visual sense, an auditory sense and a tactile sense of the occupant 2.

As an example of the configuration, which enables the occupant 2 to determine the placement of the plate member 70 in the predetermined position with the visual sense, may be the placement of the plate member 70 in a visual field range of the occupant 2.

As an example of the configuration, which enables the occupant 2 to determine the placement of the plate member 70 in the predetermined position with the auditory sense, may be as follows. Specifically, a recess may be formed at one of a movable portion of the plate member 70 and a holding portion, which is configured to hold the movable portion of the plate member 70, and a projection may be formed at the other one of the movable portion of the plate member 70 and the holding portion. In this case, when the plate member 70 is placed in the predetermined position, the recess and the projection are fitted together to generate a click sound to enable the occupant 2 to determine the placement of the plate member 70 in the predetermined position with the auditory sense of the occupant 2. Furthermore, when the recess and the projection are configured to generate a click feeling at the time of fitting the recess and the projection together, the occupant 2 can determine the placement of the plate member 70 in the predetermined position with the tactile sense of the occupant 2.

The control process, which is executed by the controller 90 of the first modification, will now be described.

First of all, the controller 90 determines whether the seat back 12 is in the upright state or the reclined state based on the information transmitted from the seat back state sensing device 20.

When it is determined that the seat back 12 is in the upright state, the controller 90 controls the first actuator 60 for the guide fin 51 such that the conditioning air, which is blown from the face blow outlet 40, is directed to the upper body of the occupant 2 and its surroundings.

In contrast, when it is determined that the seat back 12 is in the reclined state, the controller 90 controls the first actuator 60 for the guide fin 51 such that the guide fin 51 is placed in the predetermined position. Therefore, the conditioning air is blown from the face blow outlet 40 to the plate member 70. At this time, in the first modification, when the occupant 2 manually places the plate member 70 in the predetermined position, the conditioning air, which is blown from the face blow outlet 40, collides to the plate surface 71 of the plate member 70 and thereafter reaches the specific part of the occupant 2 on the seat 10 having the seat back 12 placed in the reclined state.

Furthermore, when it is determined that the seat back 12 is in the reclined state, the controller 90 may control the air conditioner 30 such that the flow rate of the conditioning air, which is blown from the face blow outlet 40, is increased from the normal flow rate.

The first modification described above can achieve the effects and advantages which are the same as those of the first embodiment. Furthermore, the first modification can simplify the structure in comparison to the first embodiment by eliminating the second actuator 80 which drives the plate member 70.

Second Modification of First Embodiment

A second modification of the first embodiment will be described. The second modification is a modification of the operation method of the air-flow direction change mechanism 50 with respect to the first embodiment, and the rest of the modification is the same as that of the first embodiment. Therefore, only the differences, which are different from the first embodiment, will be described.

In the second modification, the guide fin 51, which serves as the air-flow direction change mechanism 50, is configured to be manually operated by the occupant 2. In contrast, the plate member 70 is configured to be driven by the second actuator 80 like in the first embodiment.

The occupant 2 can determine the placement of the guide fin 51 in the predetermined position with one of the visual sense, the auditory sense and the tactile sense of the occupant 2.

As an example of the configuration, which enables the occupant 2 to determine the placement of the guide fin 51 in the predetermined position with the visual sense, may be the placement of the guide fin 51 in the visual field range of the occupant 2.

As an example of the configuration, which enables the occupant 2 to determine the placement of the guide fin 51 in the predetermined position with the auditory sense, may be as follows. Specifically, a recess may be formed at one of a movable portion of the guide fin 51 and a holding portion, which is configured to hold the movable portion of the guide fin 51, and a projection may be formed at the other one of the movable portion of the guide fin 51 and the holding portion. In this case, when the guide fin 51 is placed in the predetermined position, the recess and the projection are fitted together to generate a click sound to enable the occupant 2 to determine the placement of the guide fin 51 in the predetermined position with the auditory sense of the occupant 2. Furthermore, when the recess and the projection are configured to generate a click feeling at the time of fitting the recess and the projection together, the occupant 2 can determine the placement of the plate member 70 in the predetermined position with the tactile sense of the occupant 2.

An another example of the configuration, which enables the occupant 2 to determine the placement of the guide fin 51 in the predetermined position with the tactile sense of the occupant 2, may be a configuration where the guide fin 51 is placed in the predetermined position when the portion of the guide fin 51 contacts, for example, the inner wall of the flow passage of the face blow outlet 40. This point will be described in a third embodiment described later.

The control process, which is executed by the controller 90 of the second modification, will now be described.

First of all, the controller 90 determines whether the seat back 12 is in the upright state or the reclined state based on the information transmitted from the seat back state sensing device 20.

When it is determined that the seat back 12 is in the upright state, the controller 90 controls the second actuator 80 for the plate member 70 such that the plate member 70 is placed in the normal state where the plate surface 71 of the plate member 70 is placed along the vehicle cabin ceiling 4.

In contrast, when it is determined that the seat back 12 is in the reclined state, the controller 90 controls the second actuator 80 for the plate member 70 such that the plate member 70 is placed in the predetermined position. Therefore, the plate member 70 is placed in the predetermined position. At this time, in the second modification, when the occupant 2 manually places the guide fin 51 in the predetermined position, the conditioning air, which is blown from the face blow outlet 40, collides to the plate surface 71 of the plate member 70 and thereafter reaches the specific part of the occupant 2 on the seat 10 having the seat back 12 placed in the reclined state.

Furthermore, when it is determined that the seat back 12 is in the reclined state, the controller 90 may control the air conditioner 30 such that the flow rate of the conditioning air, which is blown from the face blow outlet 40, is increased from the normal flow rate.

The second modification described above can achieve the effects and advantages which are the same as those of the first embodiment. Furthermore, the second modification can simplify the structure in comparison to the first embodiment by eliminating the first actuator 60 which drives the guide fin 51.

Third Modification of First Embodiment

A third modification of the first embodiment will be described. The third modification is a modification of the operation methods of the air-flow direction change mechanism 50 and the plate member 70 with respect to the first embodiment, and the rest of the third modification is the same as that of the first embodiment. Therefore, only the differences, which are different from the first embodiment, will be described.

In the third modification, the guide fin 51 and the plate member 70 are both configured to be manually operated by the occupant 2. The occupant 2 can determine the placement of the guide fin 51 in the predetermined position with one of the visual sense, the auditory sense and the tactile sense of the occupant 2. The occupant 2 can determine the placement of the plate member 70 in the predetermined position with one of the visual sense, the auditory sense and the tactile sense of the occupant 2.

At the time of placing the seat back 12 in the reclined state, the occupant 2 can manually place the guide fin 51 in the predetermined position thereof and can also manually place the plate member 70 in the predetermined position thereof. With one of the visual sense, the auditory sense and the tactile sense, the occupant 2 can determine that each of the guide fin 51 and the plate member 70 is placed in the predetermined position thereof. Thus, when the occupant 2 places each of the guide fin 51 and the plate member 70 in the predetermined position thereof, the conditioning air, which is blown from the face blow outlet 40 of the instrument panel 3, collides to the plate surface 71 of the plate member 70. Then, the conditioning air, which collides to the plate surface 71 of the plate member 70, changes the flow direction thereof along the plate surface 71 of the plate member 70 and reaches the specific part of the occupant 2 on the seat 10 having the seat back 12 placed in the reclined state.

Even in the third modification discussed above, in the state where each of the guide fin 51 and the plate member 70 is placed in the predetermined position thereof, the conditioning air, which is blown from the face blow outlet 40, collides to the plate surface 71 of the plate member 70, and thereafter the conditioning air changes the flow direction thereof and reaches the specific part of the occupant 2. Therefore, the third modification can also achieve the effects and advantages which are the same as those of the first embodiment.

In the third modification, it is possible to eliminate: the first actuator 60, which drives the guide fin 51; the second actuator 80, which drives the plate member 70; the controller 90, which controls the first actuator 60 and the second actuator 80; and the seat back state sensing device 20. Therefore, according to the third modification, the structure can be simplified in comparison to the first embodiment, the first modification and the second modification.

Second Embodiment

A second embodiment will be described. The second embodiment is a modification of the structure of the plate member 70 with respect to the first embodiment, and the rest of the second embodiment is the same as that of the first embodiment. Therefore, only the differences, which are different from the first embodiment, will be described.

Figure 4:
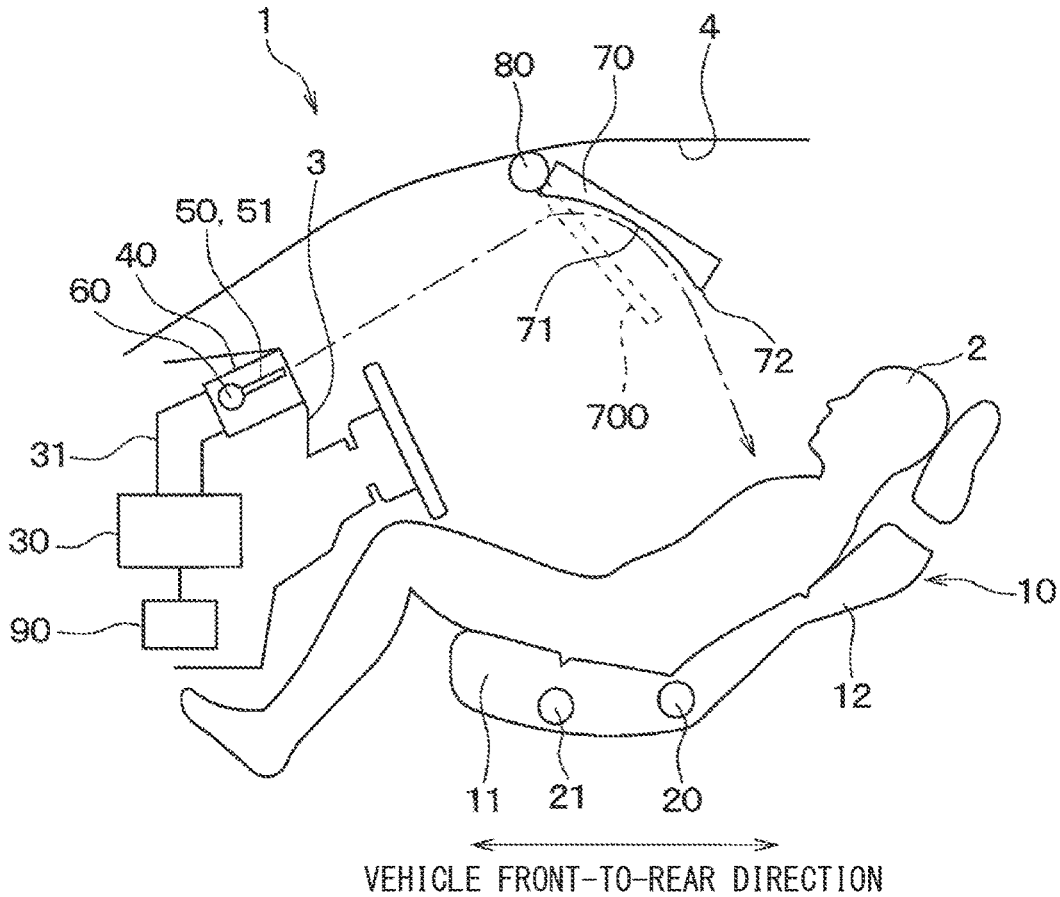
FIG. 4 is a schematic view of the vehicle that has a vehicle air-conditioning control system according to a second embodiment.

As shown in FIG. 4, in the second embodiment, the plate surface 71 of the plate member 70, to which the conditioning air blown from the face blow outlet 40 collides, is shaped in a curved form that is concavely curved in the vehicle front-to-rear direction. In this case, the conditioning air, which is blown from the face blow outlet 40, changes the flow direction thereof along the curved surface of the plate member 70. Therefore, diffusion of the conditioning air and a decrease in the flow rate of the conditioning air are limited, and thereby the conditioning air can be concentratedly applied to the specific part of the occupant 2.

Furthermore, the plate member 70 of the second embodiment can largely change the flow direction of the conditioning air by configuring the plate member 70 such that a rear edge portion 72 of the plate member 70 is warped toward the vehicle cabin. A dotted line 700 in FIG. 4 indicates a position of the plate member 70 at the time of applying the conditioning air to the specific part of the occupant 2 in the case where the plate surface 71 of the plate member 70 is shaped in a planar surface form. In contrast, the plate member 70 of the second embodiment can reduce a required downward tilt angle of the plate member 70 relative to the vehicle cabin ceiling 4, which is required to apply the conditioning air to the specific part of the occupant 2 via the plate member 70. Therefore, the plate member 70 of the second embodiment can reduce feeling of oppression imposed by the plate member 70 to the occupant 2 on the seat 10 having the seat back 12 placed in the reclined state.

Figure 5:
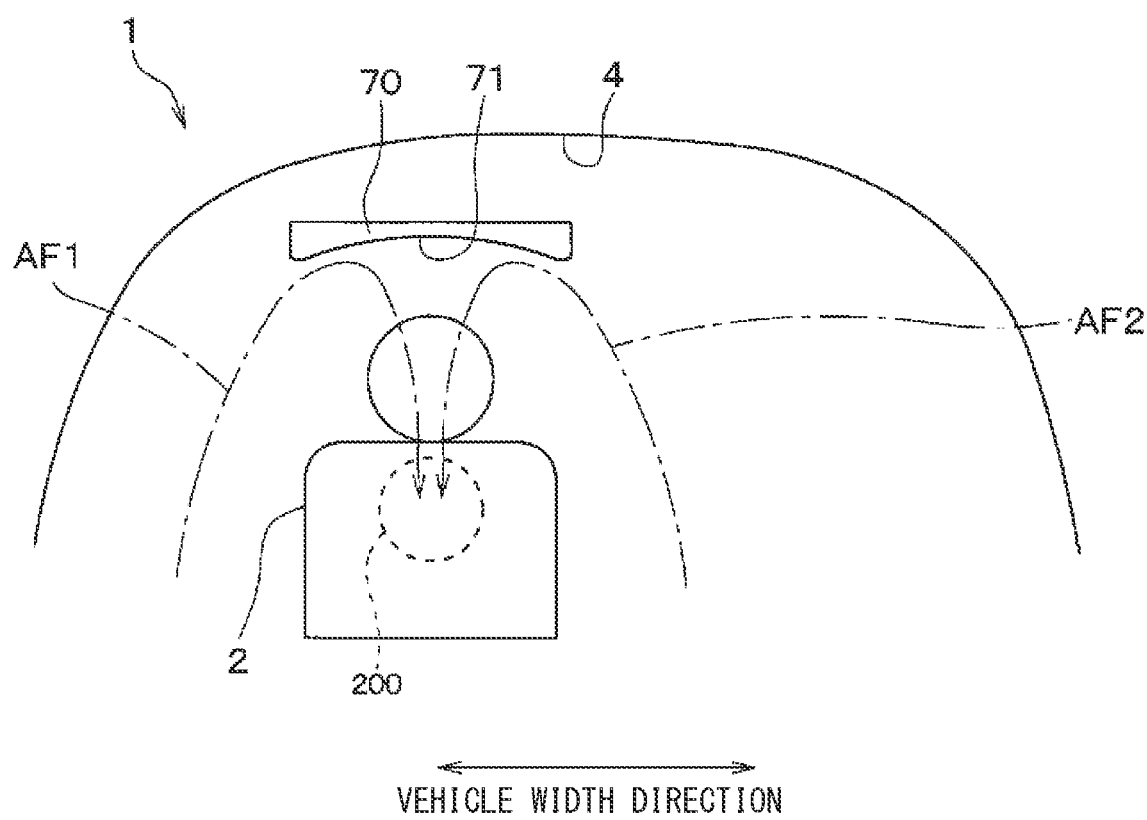
FIG. 5 is a schematic view of the vehicle that has the vehicle air-conditioning control system according to the second embodiment.

Furthermore, as shown in FIG. 5, in the second embodiment, the plate surface 71 of the plate member 70, to which the conditioning air blown from the face blow outlet 40 collides, may be shaped in a curved form that is concavely curved in the vehicle width direction. In this case, as indicated by dot-dash lines AF1, AF2 of FIG. 5, the conditioning air, which is blown from the face blow outlet 40 located at a center in the vehicle width direction, and the conditioning air, which is blown from the face blow outlet 40 located at an outer side in the vehicle width direction, respectively change the flow direction thereof along the curved surface of the plate member 70. Then, the conditioning air, which is blown from these face blow outlets 40, are concentratedly applied to the specific part (for example, a chest) of the occupant 2, which is indicated by a dotted line 200. As discussed above, even in the case where the plate surface 71 of the plate member 70 is shaped in the curved form that is concavely curved in the vehicle width direction, the conditioning air can be concentratedly applied to the specific part of the occupant 2 by limiting the diffusion of the conditioning air and the decrease in the flow rate of the conditioning air.

Here, it should be noted that the plate member 70 may be shaped in the curved form that is concavely curved only in the vehicle front-to-rear direction, as indicated in FIG. 4, or the plate member 70 may be shaped in the curved form that is concavely curved only in the vehicle width direction, as indicated in FIG. 5. Alternatively, the plate member 70 may be shaped in a curved form that is concavely curved in the vehicle front-to-rear direction and is also concavely curved in the vehicle width direction.

Modification of Second Embodiment

A modification of the second embodiment will be described. The modification of the second embodiment is a modification of the structure of the plate member 70 with respect to the second embodiment, and the rest of the modification of the second embodiment is the same as that of the second embodiment. Therefore, only the differences, which are different from the second embodiment, will be described.

In the modification of the second embodiment, the plate member 70 is bendable or flexible (i.e., can be bent or flexed (curved)) at a middle of the plate member 70 in the vehicle width direction or a middle of the plate member 70 in the vehicle front-to-rear direction. Specifically, the plate member 70 may be shaped in a planar form in the normal state where the plate member 70 is placed along the vehicle cabin ceiling 4. Thus, in the normal state of the plate member 70, it is possible to reduce the amount of projection of the plate member 70 from the ceiling into the vehicle cabin.

Furthermore, in the projecting state where the plate surface 71 of the plate member 70 projects into the vehicle cabin, the plate member 70 can be bent or flexed (curved) manually by the occupant 2 or can be bent or flexed by driving the plate member 70 with an actuator. Therefore, when the plate member 70 is bent or flexed in the projecting state of the plate member 70, it is possible to limit the diffusion of the conditioning air, which collides to the plate surface 71, and the decrease in the flow rate of the conditioning air, which collides to the plate surface 71, and thereby the conditioning air can be concentratedly applied to the specific part of the occupant 2, like in the second embodiment described above.

Third Embodiment

A third embodiment will be described. The third embodiment is a modification of the structure of the guide fin 51, which serves as the air-flow direction change mechanism 50, with respect to the first embodiment, and the rest of the third embodiment is the same as that of the first embodiment. Therefore, only the differences, which are different from the first embodiment, will be described.

Figure 6:
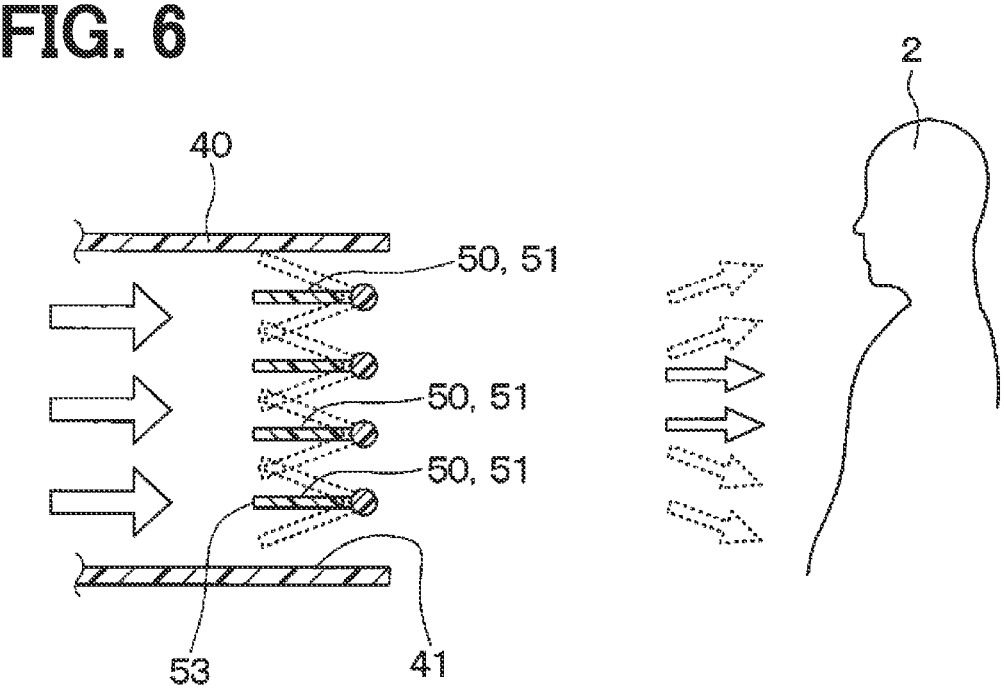
FIG. 6 is a schematic view of a blow outlet of the vehicle that has a vehicle air-conditioning control system according to a third embodiment.

As shown in FIG. 6, a plurality of guide fins 51, which are installed at the face blow outlet 40, can arbitrarily change the flow direction of the conditioning air, which is blown from the face blow outlet 40. The guide fins 51 are configured to be directed in a common direction.

When each guide fin 51 is located in a range indicated by a solid line and dotted lines in FIG. 6, the conditioning air is blown from the face blow outlet 40 to the upper body, which includes the face, the chest or the torso, of the occupant 2 who is in the upright posture and its surroundings.

Figure 7:
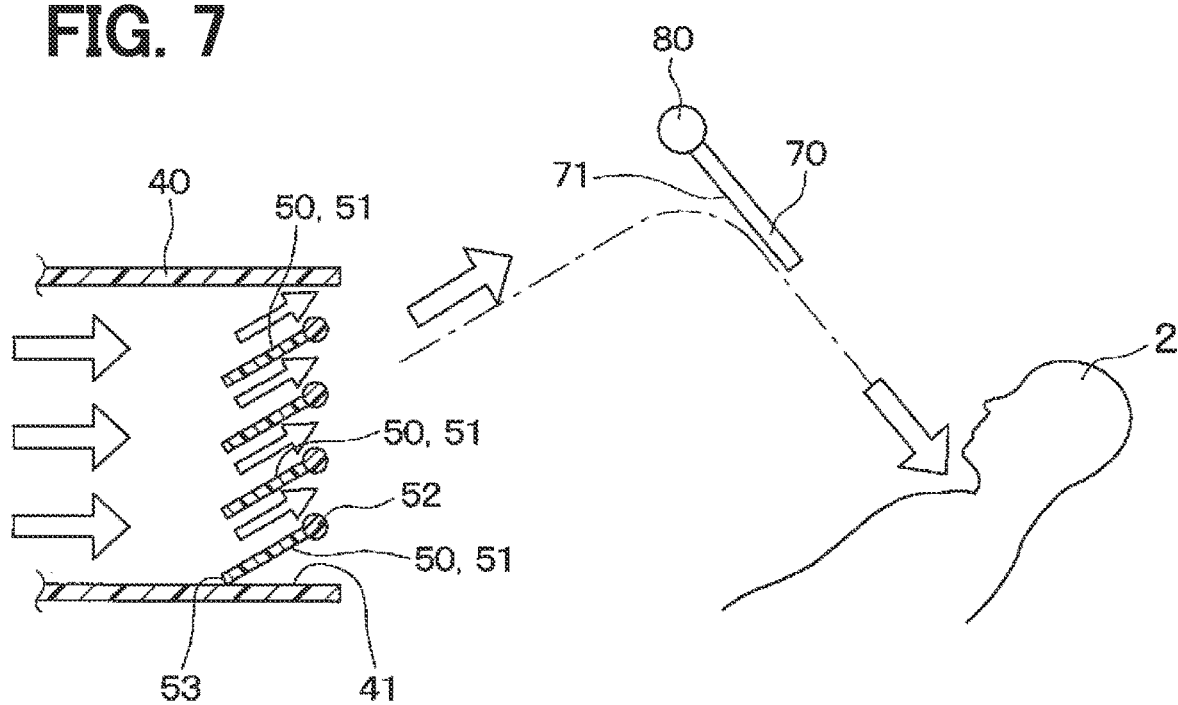
FIG. 7 is a schematic view of the blow outlet and a plate member of the vehicle that has the vehicle air-conditioning control system according to the third embodiment.

As shown in FIG. 7, in the third embodiment, the guide fins 51 are configured such that an end portion 53 of the guide fin 51, which is opposite from a shaft 52, contacts the inner wall 41 of the flow passage, which forms the face blow outlet 40, the conditioning air is blown from the face blow outlet 40 toward the plate surface 71 of the plate member 70. Specifically, the guide fin 51 is placed in the predetermined position described above in the state where the end portion 53 of the guide fin 51, which is opposite to the shaft 52, contacts the inner wall 41 of the flow passage, which forms the face blow outlet 40. Therefore, the occupant 2 can notice that the guide fin 51 is in the predetermined position with the feeling of a hand of the occupant 2. Therefore, the occupant 2 can easily perform the task of manually setting the guide fin 51 in the predetermined position.

The positioning of the guide fin 51 is not necessarily limited to the above-described one where the guide fin 51 is placed in the predetermined position when the portion of the guide fin 51 contacts the inner wall 41 of the flow passage. For example, the positioning of the guide fin 51 may be achieved such that the guide fin 51 is placed in the predetermined position when the portion of the guide fin 51 contacts a structure in the flow passage. The positioning of the guide fin 51 is not necessarily limited to the above-described one where the guide fin 51 is placed in the predetermined position when the end portion 53 of the guide fin 51 contacts the inner wall 41 or the structure in the flow passage. For example, the positioning of the guide fin 51 may be achieved such that the guide fin 51 is placed in the predetermined position when at least a part of a movable portion of the guide fin 51 contacts the inner wall 41 or the structure in the flow passage.

Figure 8:
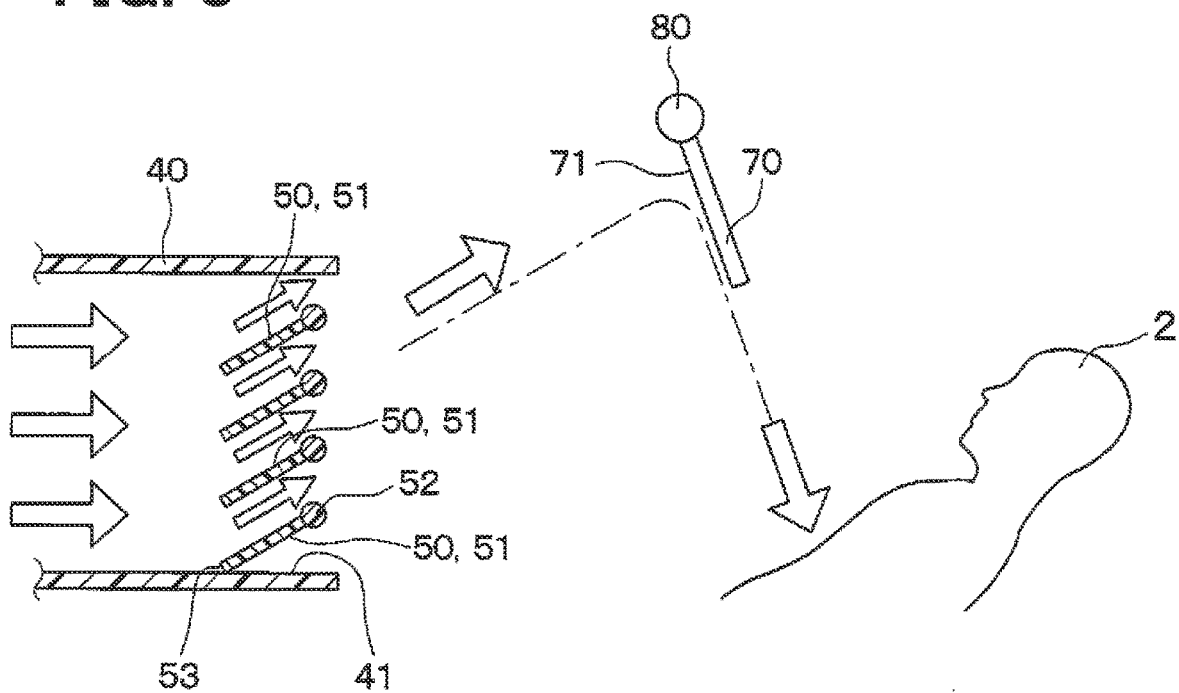
FIG. 8 is a schematic view of the blow outlet and the plate member of the vehicle that has the vehicle air-conditioning control system according to the third embodiment.

Furthermore, in the third embodiment, the angle adjustment of the plate member 70 will be described in detail. As described above, the position of the plate member 70 can be arbitrarily changed through the operation of the occupant 2 or the control of the second actuator 80. In FIG. 7, the position of the plate member 70 is set such that the conditioning air, which is blown from the face blow outlet 40 and collides to the plate member 70, changes the flow direction thereof along the plate surface 71 of the plate member 70 and reaches a neck of the occupant 2. In FIG. 8, the position of the plate member 70 is set such that the conditioning air, which is blown from the face blow outlet 40 and collides to the plate member 70, changes the flow direction thereof along the plate surface 71 of the plate member 70 and reaches a chest of the occupant 2. As discussed above, the flow of the conditioning air can be adjusted to reach any specific part of the occupant 2 by changing the position and/or the angle of the plate member 70.

Fourth Embodiment

A fourth embodiment will be described. In the fourth embodiment, the flow direction of the conditioning air, which is blown from the face blow outlet 40, will be described in detail.

Figure 9:
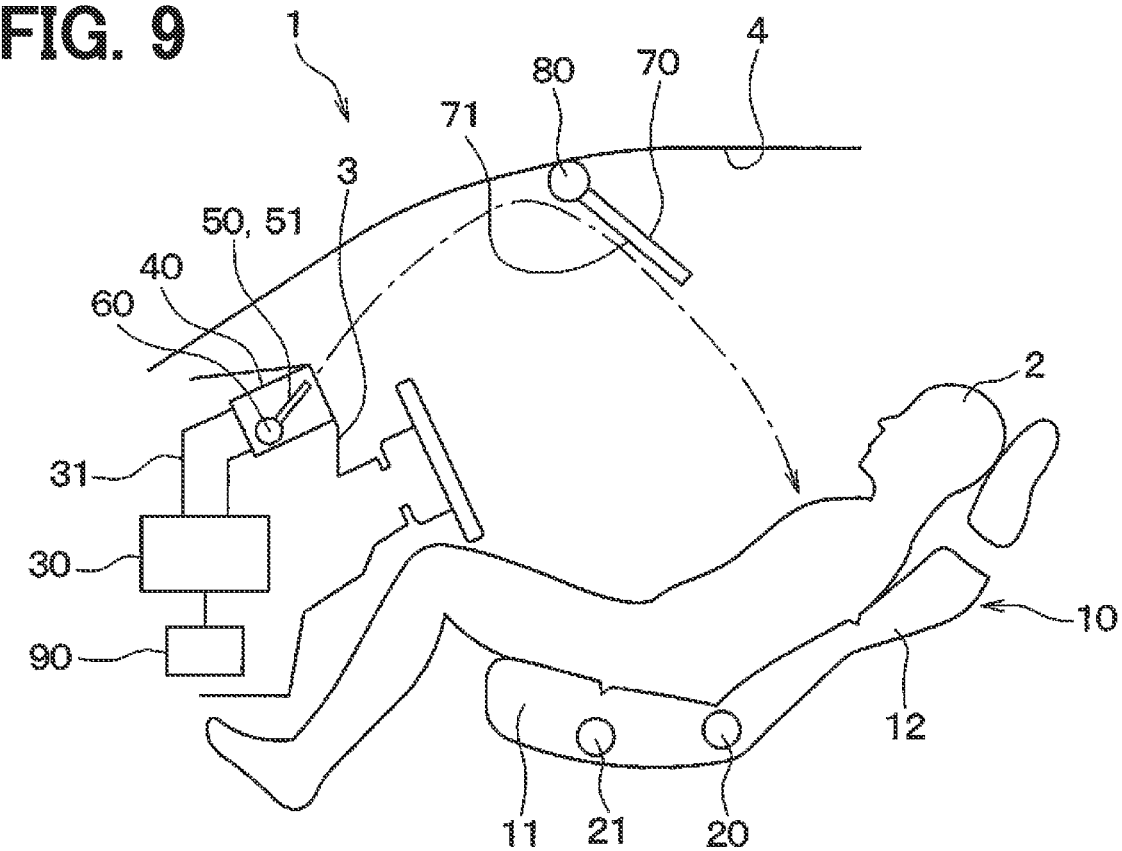
FIG. 9 is a schematic view of the vehicle that has a vehicle air-conditioning control system according to a fourth embodiment.

As shown in FIG. 9, in the fourth embodiment, in view of buoyancy of the conditioning air blown from the face blow outlet 40, the guide fin 51, which is installed at the face blow outlet 40, is adjusted such that the face blow outlet 40 blows the conditioning air toward a vehicle front side portion of the plate member 70.

Specifically, in a case where the temperature of the conditioning air, which is blown from the face blow outlet 40, is lower than the temperature of the air in the vehicle cabin, the conditioning air may flow along a parabolic line due to gravity. In view of the above point, it is possible to reliably collide the conditioning air to the plate surface 71 of the plate member 70 by adjusting the guide fin 51 such that the conditioning air is blown from the face blow outlet 40 toward the vehicle front side portion of the plate member 70. The conditioning air, which collides to the plate surface 71 of the plate member 70, changes the flow direction thereof along the plate surface 71 of the plate member 70 and reaches the specific part of the occupant 2 on the seat 10 having the seat back 12 placed in the reclined state. Therefore, the fourth embodiment can also achieve the effects and advantages which are the same as those of the first embodiment.

Fifth Embodiment

A fifth embodiment will be described. In the fifth embodiment, the structure of the face blow outlet 40 will be described in detail.

Figure 10:
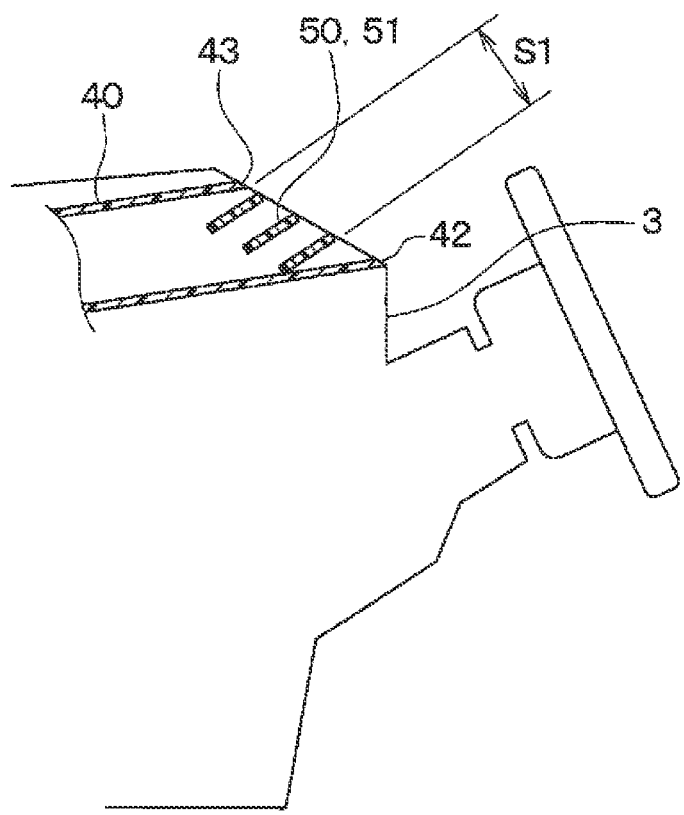
FIG. 10 is a cross-sectional view around a blow outlet of a vehicle air-conditioning control system according to a fifth embodiment.

As shown in FIG. 10, in the fifth embodiment, an opening of the face blow outlet 40 located at the instrument panel 3 is arranged such that an upper end portion 43 of the opening of the face blow outlet 40 is located on the vehicle front side of a lower end portion 42 of the opening of the face blow outlet 40. Thereby, when the guide fins 51 are respectively placed in the predetermined position described above, an opening cross-sectional area S1 of the opening of the face blow outlet 40, through which the conditioning air is blown, can be increased.

Figure 11:
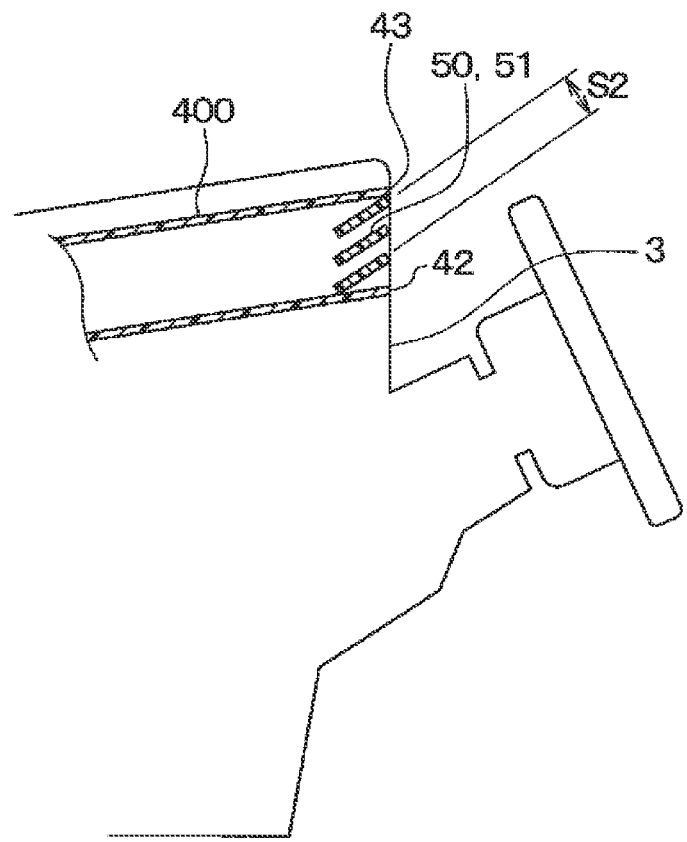
FIG. 11 is a cross-sectional view around a blow outlet of a comparative example with respect to the fifth embodiment.

A face blow outlet 400 of a comparative example is shown in FIG. 11 for comparison with the configuration of the fifth embodiment. In this comparative example, the opening of the face blow outlet 400 located at the instrument panel 3 is arranged such that the lower end portion 42 and the upper end portion 43 are located generally at the same position in the vehicle front-to-rear direction. In this case, when the guide fins 51 are respectively placed in the predetermined position described above, an opening cross-sectional area S2 of the opening of the face blow outlet 40, through which the conditioning air is blown, is reduced in comparison to the opening cross-sectional area S1 of the fifth embodiment.

In contrast to the configuration of the comparative example, according to the fifth embodiment, when the guide fins 51 are respectively placed in the predetermined position described above, the opening cross-sectional area S1 of the opening of the face blow outlet 40, through which the conditioning air is blown, can be increased. Therefore, a pressure loss of the conditioning air, which is blown from the face blow outlet 40, is reduced, and thereby the conditioning air can be efficiently delivered to the occupant 2.

Sixth Embodiment

A sixth embodiment will be described. The sixth embodiment is a modification of the structure of the air-flow direction change mechanism 50 with respect to the first embodiment, and the rest of the sixth embodiment is the same as that of the first embodiment. Therefore, only the differences, which are different from the first embodiment, will be described.

Figure 12:
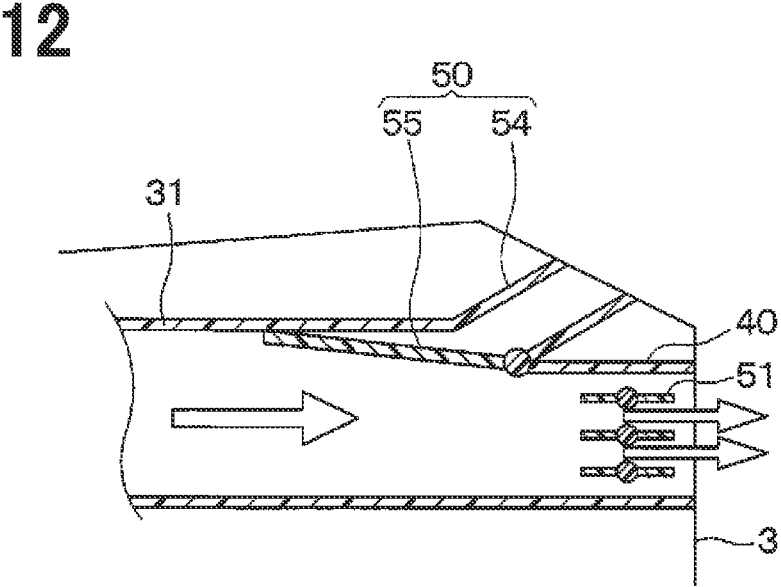
FIG. 12 is a cross-sectional view around a blow outlet of a vehicle air-conditioning control system according to a sixth embodiment.
Figure 13:
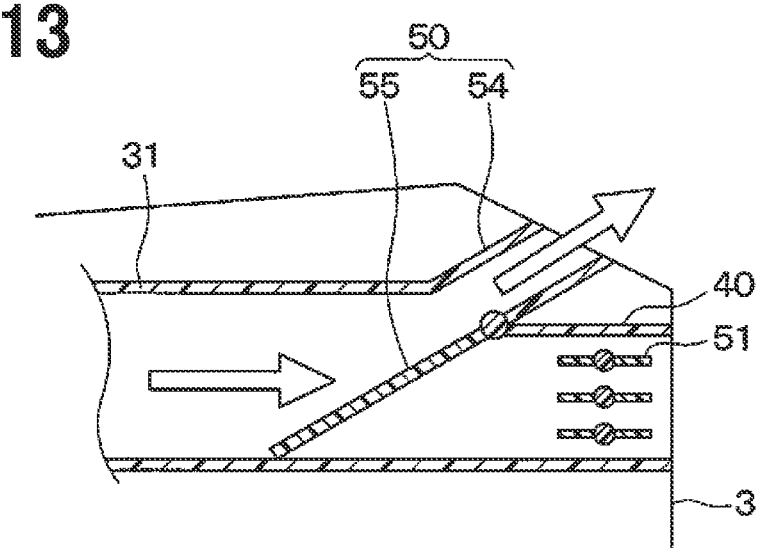
FIG. 13 is a cross-sectional view around the blow outlet of the vehicle air-conditioning control system according to the sixth embodiment.

As shown in FIGS. 12 and 13, in the sixth embodiment, the air-flow direction change mechanism 50, which changes a flow direction of the conditioning air blown from a blow outlet located at the instrument panel 3, includes a dedicated air outlet 54 and a switching door 55.

The dedicated air outlet 54 is branched from the duct 31 which communicates between the air conditioner 30 and the face blow outlet 40. An opening direction and an opening cross-sectional area of the dedicated air outlet 54 are adjusted such that the conditioning air, which is blown from the dedicated air outlet 54, collides to the plate surface 71 of the plate member 70.

The switching door 55 switches a flow of the conditioning air between: a flow of the conditioning air, which flows from the air conditioner 30 toward the face blow outlet 40 through the duct 31; and a flow of the conditioning air, which flows from the air conditioner 30 toward the dedicated air outlet 54 through the duct 31. The switching door 55 is driven by the first actuator 60, which serves as the blow outlet drive device. The switching door 55 may be configured to be manually operated by the occupant 2.

FIG. 12 shows the state around the face blow outlet 40 when the seat back 12 is in the upright state. At this time, the switching door 55 switches the flow passage such that the conditioning air, which is generated by the air conditioner 30, flows to the face blow outlet 40 through the duct 31. Therefore, this conditioning air is blown from the face blow outlet 40 to the upper body of the occupant 2 on the seat 10 having the seat back 12 placed in the upright state and the surroundings of the upper body of the occupant 2.

FIG. 13 shows the state around the face blow outlet 40 when the seat back 12 is in the reclined state. At this time, the switching door 55 switches the flow passage such that the conditioning air, which is generated by the air conditioner 30, flows to the dedicated air outlet 54 through the duct 31. Thus, the conditioning air is blown from the dedicated air outlet 54 toward the plate surface 71 of the plate member 70. Then, the conditioning air, which collides to the plate surface 71 of the plate member 70, changes the flow direction thereof along the plate surface 71 of the plate member 70 and reaches the specific part of the occupant 2 on the seat 10 having the seat back 12 placed in the reclined state.

In the sixth embodiment described above, the conditioning air is blown from the dedicated air outlet 54 when the seat back 12 is in the reclined state, so that the pressure loss of the conditioning air, which is caused by the guide fins 51 installed at the face blow outlet 40, is eliminated. Therefore, the conditioning air, which is blown from the dedicated air outlet 54, can be efficiently delivered to the occupant 2 via the plate member 70.

Other Embodiments

The present disclosure is not necessarily limited to the above embodiments, and modifications of the above embodiments may be made. Further, the above embodiments are not unrelated to each other and can be appropriately combined unless such a combination is obviously impossible. In each of the above embodiments, it is needless to say that the elements constituting the embodiment are not necessarily essential, unless otherwise clearly indicated as essential or in principle considered to be clearly essential. In each of the above embodiments, when a numerical value such as the number, numerical value, amount, range or the like of the constituent elements of the embodiment is mentioned, the present disclosure should not be limited to such a numerical value unless it is clearly stated that it is essential and/or it is required in principle. In each of the above embodiments, when referring to the shape, the positional relationship or the like of the constituent elements, the present disclosure should not be limited to such a shape, positional relationship or the like unless it is clearly stated that it is essential and/or it is required in principle.

The controller and the method thereof described in the present disclosure may be realized by a dedicated computer provided by a processor and a memory programmed to perform one or more functions embodied by a computer program. Alternatively, the controller and the method thereof described in the present disclosure may be realized by a dedicated computer provided by a processor with one or more dedicated hardware logic circuits. Alternatively, the controller and the method thereof described in the present disclosure may be realized by at least one dedicated computer provided by a combination of: a processor and a memory programmed to perform one or more functions embodied by a computer program; and a processor with one or more hardware logic circuits. Further, the computer program may be stored in a non-transitory computer-readable medium as an instruction executed by the computer.

CONCLUSION

According to a first aspect recited in one or more or all of the above embodiments, a vehicle air-conditioning control system is applied to a vehicle that includes a seat, an air conditioner, a blow outlet, an air-flow direction change mechanism, a blow outlet drive device and a seat back state sensing device. The seat is located in a vehicle cabin. The air conditioner is configured to generate conditioning air. The blow outlet is located at an instrument panel and is configured to blow the conditioning air, which is generated from the air conditioner, into the vehicle cabin. The air-flow direction change mechanism is configured to change a flow direction of the conditioning air, which is blown from the blow outlet, in a vertical direction. The blow outlet drive device is configured to drive the air-flow direction change mechanism. The seat back state sensing device is configured to sense a state of a seat back of the seat. The vehicle air-conditioning control system includes a controller that is configured to control the blow outlet drive device based on a sensed result of the seat back state sensing device. The vehicle includes a plate member and a plate member drive device. The plate member is installed at a vehicle cabin ceiling and is operable between: a normal state where a plate surface of the plate member is placed along the vehicle cabin ceiling; and a projecting state where the plate surface of the plate member projects into the vehicle cabin. The plate member drive device is configured to drive the plate member. When a reclined state of the seat back is sensed with the seat back state sensing device, the controller controls the blow outlet drive device and thereby places the air-flow direction change mechanism in a predetermined position of the air-flow direction change mechanism to direct the conditioning air, which is blown from the blow outlet, such that the conditioning air collides to the plate surface of the plate member. At this time, the controller also controls the plate member drive device to place the plate member in a predetermined position of the plate member, so that the conditioning air, which collides to the plate surface of the plate member, is directed to and reaches a specific part of an occupant who is on the seat having the seat back placed in the reclined state.

According to a second aspect, a vehicle air-conditioning control system is applied to a vehicle that includes a seat, an air conditioner, a blow outlet, an air-flow direction change mechanism, a plate member and a seat back state sensing device. The seat is located in a vehicle cabin. The air conditioner is configured to generate conditioning air. The blow outlet is located at an instrument panel and is configured to blow the conditioning air, which is generated from the air conditioner, into the vehicle cabin. The air-flow direction change mechanism is configured to change a flow direction of the conditioning air, which is blown from the blow outlet, in a vertical direction. The plate member is installed at a vehicle cabin ceiling and is operable between: a normal state where a plate surface of the plate member is placed along the vehicle cabin ceiling; and a projecting state where the plate surface of the plate member projects into the vehicle cabin. The seat back state sensing device is configured to sense a state of a seat back of the seat. One of the air-flow direction change mechanism and the plate member is configured to be driven by an actuator, and another one of the air-flow direction change mechanism and the plate member is configured to be driven manually by an occupant. The another one of the air-flow direction change mechanism and the plate member is configured to enable the occupant to determine placement of the another one of the air-flow direction change mechanism and the plate member in a predetermined position of the another one of the air-flow direction change mechanism and the plate member with one of a visual sense, an auditory sense and a tactile sense of the occupant. The vehicle air-conditioning control system includes a controller that is configured to control the actuator based on a sensed result of the seat back state sensing device. When a reclined state of the seat back is sensed with the seat back state sensing device, the controller controls the actuator and thereby places the one of the air-flow direction change mechanism and the plate member in a predetermined position of the one of the air-flow direction change mechanism and the plate member. At this time, when the another one of the air-flow direction change mechanism and the plate member is placed in the predetermined position of the another one of the air-flow direction change mechanism and the plate member, the conditioning air, which is blown from the blow outlet, collides to the plate surface of the plate member and thereafter reaches a specific part of the occupant who is on the seat having the seat back placed in the reclined state.

According to a third aspect, a vehicle air-conditioning system includes a seat, an air conditioner, a blow outlet, an air-flow direction change mechanism and a plate member. The seat is located in a vehicle cabin. The air conditioner is configured to generate conditioning air. The blow outlet is located at an instrument panel and is configured to blow the conditioning air, which is generated from the air conditioner, into the vehicle cabin. The air-flow direction change mechanism is configured to change a flow direction of the conditioning air, which is blown from the blow outlet, in a vertical direction. The plate member is installed at a vehicle cabin ceiling and is operable between: a normal state where a plate surface of the plate member is placed along the vehicle cabin ceiling; and a projecting state where the plate surface of the plate member projects into the vehicle cabin. Each of the air-flow direction change mechanism and the plate member is configured to enable an occupant to determine placement of each of the air-flow direction change mechanism and the plate member in a predetermined position of each of the air-flow direction change mechanism and the plate member with one of a visual sense, an auditory sense and a tactile sense of the occupant. In the vehicle air-conditioning system, the air-flow direction change mechanism and the plate member are configured such that in a state where a seat back of the seat is in a reclined state, and each of the air-flow direction change mechanism and the plate member is in the predetermined position of each of the air-flow direction change mechanism and the plate member, the conditioning air, which is blown from the blow outlet, collides to the plate surface of the plate member and thereafter reaches a specific part of the occupant who is on the seat having the seat back placed in the reclined state.

According to a fourth aspect, a controller for air conditioning of a vehicle is applied to the vehicle that includes a seat, an air conditioner, a blow outlet, an air-flow direction change mechanism, a blow outlet drive device, a seat back state sensing device, a plate member and a plate member drive device. The seat is located in a vehicle cabin. The air conditioner is configured to generate conditioning air. The blow outlet is located at an instrument panel and is configured to blow the conditioning air, which is generated from the air conditioner, into the vehicle cabin. The air-flow direction change mechanism is configured to change a flow direction of the conditioning air, which is blown from the blow outlet, in a vertical direction. The blow outlet drive device is configured to drive the air-flow direction change mechanism. The seat back state sensing device is configured to sense a state of a seat back of the seat. The plate member is installed at a vehicle cabin ceiling and is operable between: a normal state where a plate surface of the plate member is placed along the vehicle cabin ceiling; and a projecting state where the plate surface of plate member projects into the vehicle cabin. The plate member drive device is configured to drive the plate member. When a reclined state of the seat back is sensed with the seat back state sensing device, the controller controls the blow outlet drive device and thereby places the air-flow direction change mechanism in a predetermined position of the air-flow direction change mechanism to direct the conditioning air, which is blown from the blow outlet, such that the conditioning air collides to the plate surface of the plate member. The controller also controls the plate member drive device to place the plate member in a predetermined position of the plate member, so that the conditioning air, which collides to the plate surface of the plate member, is directed to and reaches a specific part of an occupant who is on the seat having the seat back placed in the reclined state.

A flow path length of the conditioning air, which is blown from the blow outlet of the instrument panel to the specific part of the occupant via the plate member, is longer than a flow path length of the conditioning air, which is directly blown from the blow outlet of the instrument panel to the specific part of the occupant, so that a pressure loss becomes larger.

In view of this point, according to a fifth aspect, when the reclined state of the seat back is sensed with the seat back state sensing device, the controller controls the air conditioner and thereby increases a flow rate of the conditioning air blown from the blow outlet in comparison to an upright state of the seat back. Thus, even in the reclined state of the seat back, the vehicle air-conditioning control system can deliver the conditioning air, the flow rate of which is close to the flow rate of the conditioning air delivered in the upright state of the seat back.

According to a sixth aspect, when the reclined state of the seat back is sensed with the seat back state sensing device, the controller controls the air conditioner and thereby increases a flow rate of the conditioning air blown from the blow outlet in comparison to an upright state of the seat back.

Therefore, the sixth aspect can also achieve the effects and advantages which are the same as those of the fifth aspect.

According to a seventh aspect, in the vehicle air-conditioning system, the plate surface of the plate member, to which the conditioning air blown from the blow outlet collides, is shaped in a curved form that is concavely curved in a vehicle front-to-rear direction.

Therefore, the plate member can change the flow direction of the conditioning air such that diffusion of the conditioning air and a decrease in the flow rate of the conditioning air are limited, and thereby the conditioning air can be concentratedly applied to the specific part of the occupant.

Furthermore, the plate member can largely change the flow direction of the conditioning air along the plate surface which is concavely curved, so that it is possible to reduce a required downward tilt angle of the plate member relative to the vehicle cabin ceiling, which is required to apply the conditioning air to the specific part of the occupant via the plate member. Therefore, it is possible to reduce feeling of oppression imposed by the plate member to the occupant on the seat having the seat back placed in the reclined state.

According to an eighth aspect, in the vehicle air-conditioning system, the plate surface of the plate member, to which the conditioning air blown from the blow outlet collides, is shaped in a curved form that is concavely curved in a vehicle width direction.

Therefore, the plate member can change the flow direction of the conditioning air such that diffusion of the conditioning air and a decrease in the flow rate of the conditioning air are limited, and thereby the conditioning air can be concentratedly applied to the specific part of the occupant.

According to a ninth aspect, in the vehicle air-conditioning system, the plate member is bendable or flexible at a middle of the plate member in a vehicle width direction or a middle of the plate member in a vehicle front-to-rear direction.

Thus, in the normal state where the plate member is placed along the vehicle cabin ceiling, the plate member is shaped in a planar form, and thereby it is possible to reduce the amount of projection of the plate member from the ceiling into the vehicle cabin. Furthermore, when the plate member is bent or flexed in the projecting state of the plate member, it is possible to limit the diffusion of the conditioning air, which collides to the plate surface, and the decrease in the flow rate of the conditioning air, which collides to the plate surface, and thereby the conditioning air can be concentratedly applied to the specific part of the occupant.

According to a tenth aspect, in the vehicle air-conditioning system, the air-flow direction change mechanism is configured such that when at least a part of a movable portion of the air-flow direction change mechanism contacts an inner wall of a flow passage, which forms the blow outlet, or a structure in the flow passage, the conditioning air is blown from the blow outlet toward the plate surface of the plate member.

Thus, with feeling of a hand of the occupant, the occupant can sense the contact of the portion of the air-flow direction change mechanism to the inner wall or the structure in the flow passage. In this state, the conditioning air is blown from the blow outlet toward the plate surface of the plate member, so that the occupant can easily adjust the air-flow direction change mechanism.

According to an eleventh aspect, the air-flow direction change mechanism includes a dedicated air outlet and a switching door. The dedicated air outlet is branched from a duct which communicates between the air conditioner and the blow outlet. The dedicated air outlet is configured such that the conditioning air, which is blown from the dedicated air outlet, collides to the plate surface of the plate member. The switching door is configured to switch a flow of the conditioning air between: a flow of the conditioning air, which flows from the air conditioner toward the blow outlet through the duct; and a flow of the conditioning air, which flows from the air conditioner toward the dedicated air outlet through the duct.

Thus, the pressure loss of the conditioning air, which is caused by the guide fin installed at the face blow outlet, is eliminated by blowing the conditioning air from the dedicated air outlet. Therefore, the conditioning air, which is blown from the dedicated air outlet, can be efficiently delivered to the occupant via the plate member.

According to a twelfth aspect, the vehicle air-conditioning system further includes a blow outlet drive device, a plate member drive device, a seat back state sensing device and a controller. The blow outlet drive device is configured to drive the air-flow direction change mechanism. The plate member drive device is configured to drive the plate member. The seat back state sensing device is configured to sense a state of the seat back. The controller is configured to control the blow outlet drive device and the plate member drive device based on a sensed result of the seat back state sensing device. When a reclined state of the seat back is sensed with the seat back state sensing device, the controller controls the blow outlet drive device and thereby places the air-flow direction change mechanism in the predetermined position to direct the conditioning air, which is blown from the blow outlet, such that the conditioning air collides to the plate surface of the plate member. The controller also controls the plate member drive device to place the plate member in the predetermined position, so that the conditioning air, which collides to the plate surface of the plate member, is directed to and reaches a specific part of an occupant who is on the seat having the seat back placed in the reclined state.

Thus, when a reclined state of the seat back is sensed with the seat back state sensing device, the controller controls the blow outlet drive device and thereby places the air-flow direction change mechanism in the predetermined position, and the controller also controls the plate member drive device and thereby places the plate member in the predetermined position. Therefore, the conditioning air, which is blown from the face blow outlet of the instrument panel, collides to the plate surface of the plate member, and then the conditioning air changes the flow direction thereof along the plate surface of the plate member and reaches the specific part of the occupant on the seat having the seat back placed in the reclined state. Therefore, when the occupant is in the reclined posture, the vehicle air-conditioning system can apply the conditioning air, which is blown from the blow outlet of the instrument panel, to the specific part of the occupant to enhance the comfort of the occupant. Also, the vehicle air-conditioning system can limit the conditioning air, which is blown from the blow outlet of the instrument panel, to reach a face of the occupant after flowing along the body of the occupant, so that it is possible to limit annoying feeling of the occupant.

According to a thirteenth aspect, the vehicle air-conditioning system further includes an actuator, a seat back state sensing device and a controller. The actuator is configured to drive one of the air-flow direction change mechanism and the plate member. The seat back state sensing device is configured to sense a state of the seat back. The controller is configured to control the actuator based on a sensed result of the seat back state sensing device. When the reclined state of the seat back is sensed with the seat back state sensing device, the controller controls the actuator and thereby places the one of the air-flow direction change mechanism and the plate member in the predetermined position of the one of the air-flow direction change mechanism and the plate member. At this time, when the another one of the air-flow direction change mechanism and the plate member is placed in the predetermined position of the another one of the air-flow direction change mechanism and the plate member, the conditioning air, which is blown from the blow outlet, collides to the plate surface of the plate member and thereafter reaches the specific part of the occupant who is on the seat having the seat back placed in the reclined state.

Thus, when the seat back is placed in the reclined state, the controller drives the actuator and thereby places the one of the air-flow direction change mechanism and the plate member in the predetermined position thereof. The occupant can manually drive the another one of the air-flow direction change mechanism and the plate member and thereby places the another one of the air-flow direction change mechanism and the plate member in the predetermined position thereof. In such a case, the conditioning air, which is blown from the blow outlet of the instrument panel, collides to the plate surface of the plate member, and then the conditioning air changes the flow direction thereof along the plate surface of the plate member and reaches the specific part of the occupant on the seat. Therefore, the thirteenth aspect can also achieve the effects and advantages which are the same as those of the twelfth aspect. Furthermore, according to the thirteenth aspect, the actuator, which drives the another one of the air-flow direction change mechanism and the plate member, is eliminated to simplify the structure in comparison to the twelfth aspect.

What is claimed is:

1. A vehicle air-conditioning control system for a vehicle while the vehicle includes:
    a seat that is located in a vehicle cabin;
    an air conditioner that is configured to generate conditioning air;
    a blow outlet that is located at an instrument panel and is configured to blow the conditioning air, which is generated from the air conditioner, into the vehicle cabin;
    an air-flow direction change mechanism that includes a guide fin configured to change a flow direction of the conditioning air, which is blown from the blow outlet, in a vertical direction;
    a blow outlet drive actuator that is configured to drive the air-flow direction change mechanism; and
    a seat back state sensing device that includes one of a sensor and a camera and is configured to sense a state of a seat back of the seat, the vehicle air-conditioning control system comprising:
    a controller that is configured to control the blow outlet drive actuator based on a sensed result of the seat back state sensing device, wherein:
    the vehicle includes:
        a plate member that is installed at a vehicle cabin ceiling and is operable between:
            a normal state where a plate surface of the plate member is placed along the vehicle cabin ceiling; and
            a projecting state where the plate surface of the plate member projects into the vehicle cabin; and
        a plate member drive actuator that is configured to drive the plate member; and
    when a reclined state of the seat back is sensed with the seat back state sensing device, the controller controls:
        the blow outlet drive actuator and thereby places the guide fin of the air-flow direction change mechanism in a predetermined position of the guide fin of air-flow direction change mechanism to direct the conditioning air, which is blown from the blow outlet, such that the conditioning air collides to the plate surface of the plate member, and
        the plate member drive actuator places the plate member in a predetermined position of the plate member, so that the conditioning air, which collides to the plate surface of the plate member, is directed to and reaches a specific part of an occupant who is on the seat having the seat back placed in the reclined state.

2. The vehicle air-conditioning control system according to claim 1, wherein when the reclined state of the seat back is sensed with the seat back state sensing device, the controller controls the air conditioner and thereby increases a flow rate of the conditioning air blown from the blow outlet in comparison to an upright state of the seat back.

3. A vehicle air-conditioning control system for a vehicle while the vehicle includes:
    a seat that is located in a vehicle cabin;
    an air conditioner that is configured to generate conditioning air;
    a blow outlet that is located at an instrument panel and is configured to blow the conditioning air, which is generated from the air conditioner, into the vehicle cabin;

an air-flow direction change mechanism that includes a guide fin configured to change a flow direction of the conditioning air, which is blown from the blow outlet, in a vertical direction;

a plate member that is installed at a vehicle cabin ceiling and is operable between:
- a normal state where a plate surface of the plate member is placed along the vehicle cabin ceiling; and
- a projecting state where the plate surface of the plate member projects into the vehicle cabin; and a seat back state sensing device that includes one of the sensor and a camera and is configured to sense a state of a seat back of the seat, wherein:

one of the guide fin of the air-flow direction change mechanism and the plate member is configured to be driven by an actuator, and another one of the guide fin of the air-flow direction change mechanism and the plate member is configured to be driven manually by an occupant;

the another one of the guide fin of the air-flow direction change mechanism and the plate member is configured to enable the occupant to determine placement of the another one of the guide fin of the air-flow direction change mechanism and the plate member in a predetermined position of the another one of the guide fin of the air-flow direction change mechanism and the plate member with one of a visual sense, an auditory sense and a tactile sense of the occupant;

the vehicle air-conditioning control system comprising a controller that is configured to control the actuator based on a sensed result of the seat back state sensing device, wherein:

when a reclined state of the seat back is sensed with the seat back state sensing device, the controller controls the actuator and thereby places the one of the guide fin of the air-flow direction change mechanism and the plate member in a predetermined position of the one of the guide fin of the air-flow direction change mechanism and the plate member, and in a state where the one of the guide fin of the air-flow direction change mechanism and the playe member is place in the predetermined position of the one of the guide fin of the air-flow direction change mechanism and the plate member, when the another one of the guide fine of the air-flow direction change mechanism and the plate member is placed in the predetermined position of the another one of the guide fin of the air-flow direction change mechanism and the plate member, the conditioning air, which is blown from the blow outlet, collides to the plate surface of the plate member and thereafter reaches a specific part of the occupant who is on the seat having the seat back placed in the reclined state.

4. The vehicle air-conditioning control system according to claim 3, wherein when the reclined state of the seat back is sensed with the seat back state sensing device, the controller controls the air conditioner and thereby increases a flow rate of the conditioning air blown from the blow outlet in comparison to an upright state of the seat back.

5. A vehicle air-conditioning system for a vehicle, comprising:
- a seat that is located in a vehicle cabin;
- an air conditioner that is configured to generate conditioning air;
- a blow outlet that is located at an instrument panel and is configured to blow the conditioning air, which is generated from the air conditioner, into the vehicle cabin;
- an air-flow direction change mechanism that includes a guide fin configured to change a flow direction of the conditioning air, which is blown from the blow outlet, in a vertical direction; and
- a plate member that is installed at a vehicle cabin ceiling and is operable between:
  - a normal state where a plate surface of the plate member is placed along the vehicle cabin ceiling; and
  - a projecting state where the plate surface of the plate member projects into the vehicle cabin, wherein:

each of the guide fin of the air-flow direction change mechanism and the plate member is configured to enable an occupant to determine placement of each of the guide fin of the air-flow direction change mechanism and the plate member in a predetermined position of each of the guide fin of the air-flow direction change mechanism and the plate member with one of a visual sense, an auditory sense and a tactile sense of the occupant;

the guide fin of the air-flow direction change mechanism and the plate member are configured such that in a state where a seat back of the seat is in a reclined state, and each of the guide fin of the air-flow direction change mechanism and the plate member is in the predetermined position of each of the guide fin of the air-flow direction change mechanism and the plate member, the conditioning air, which is blown from the blow outlet, collides to the plate surface of the plate member and thereafter reaches a specific part of the occupant who is on the seat having the seat back placed in the reclined state; and the air-flow direction change mechanism includes:
- a dedicated air outlet that is branched from a duct which communicates between the air conditioner and the blow outlet, wherein the dedicated air outlet is configured such that the conditioning air, which is blown from the dedicated air outlet, collides to the plate surface of the plate member; and
- a switching door that is configured to switch a flow of the conditioning air between:
  - a flow of the conditioning air, which flows from the air conditioner toward the blow outlet through the duct; and
  - a flow of the conditioning air, which flows from the air conditioner toward the dedicated air outlet through the duct.

6. The vehicle air-conditioning system according to claim 5, wherein the plate surface of the plate member, to which the conditioning air blown from the blow outlet collides, is shaped in a curved form that is concavely curved in a vehicle front-to-rear direction.

7. The vehicle air-conditioning system according to claim 5, wherein the plate surface of the plate member, to which the conditioning air blown from the blow outlet collides, is shaped in a curved form that is concavely curved in a vehicle width direction.

8. The vehicle air-conditioning system according to claim 5, wherein the plate member is bendable or flexible at a middle of the plate member in a vehicle width direction or a middle of the plate member in a vehicle front-to-rear direction.

9. The vehicle air-conditioning system according to claim 5, wherein the air-flow direction change mechanism is configured such that when at least a part of the guide fin of the air-flow direction change mechanism contacts an inner wall of a flow passage, which forms the blow outlet, or a structure in the flow passage, the conditioning air is blown from the blow outlet toward the plate surface of the plate member.

10. A vehicle air-conditioning system for a vehicle, comprising:
a seat that is located in a vehicle cabin;
an air conditioner that is configured to generate conditioning air;
a blow outlet that is located at an instrument panel and is configured to blow the conditioning air, which is generated from the air conditioner, into the vehicle cabin;
an air-flow direction change mechanism that includes a guide fin configured to change a flow direction of the conditioning air, which is blown from the blow outlet, in a vertical direction;
a plate member that is installed at a vehicle cabin ceiling and is operable between:
a normal state where a plate surface of the plate member is placed along the vehicle cabin ceiling; and
a projecting state where the plate surface of the plate member projects into the vehicle cabin, wherein:
each of the guide fin of the air-flow direction change mechanism and the plate member is configured to enable an occupant to determine placement of each of the guide fin of the air-flow direction change mechanism and the plate member in a predetermined position of each of the guide fin of the air-flow direction change mechanism and the plate member with one of a visual sense, an auditory sense and a tactile sense of the occupant; and
the guide fin of the air-flow direction change mechanism and the plate member are configured such that in a state where a seat back of the seat is in a reclined state, and each of the guide fin of the air-flow direction change mechanism and the plate member is in the predetermined position of each of the guide fin of the air-flow direction change mechanism and the plate member, the conditioning air, which is blown from the blow outlet, collides to the plate surface of the plate member and thereafter reaches a specific part of the occupant who is on the seat having the seat back placed in the reclined state;
a blow outlet drive actuator that is configured to drive the air-flow direction change mechanism;
a plate member actuator that is configured to drive the plate member;
a seat back state sensing device that includes one of sensor and a camera and is configured to sense a state of the seat back; and
a controller that is configured to control the blow outlet drive actuator and the plate member drive actuator based on a sensed result of the seat back state sensing device, wherein:
when the reclined state of the seat back is sensed with the seat back state sensing device, the controller controls;
the blow outlet drive actuator and thereby places the guide fin of the air-flow direction change mechanism in the predetermined position of the guide fin of the air-flow direction change mechanism to direct the conditioning air, which is blown from the blow outlet, such that the conditioning air collides to the plate surface of the plate member, and plate member in the predetermined position of the plate member, so that the conditioning air, which collides to the plate surface of the plate member, reaches the specific part of the occupant who is on the seat having the seat back placed in the reclined state.

11. The vehicle air-conditioning system according to claim 10, wherein the plate surface of the plate member, to which the conditioning air blown from the blow outlet collides, is shaped in a curved form that is concavely curved in a vehicle front-to-rear direction.

12. The vehicle air-conditioning system according to claim 10, wherein the plate surface of the plate member, to which the conditioning air blown from the blow outlet collides, is shaped in a curved form that is concavely curved in a vehicle width direction.

13. The vehicle air-conditioning system according to claim 10, wherein the plate member is bendable or flexible at a middle of the plate member in a vehicle width direction or a middle of the plate member in a vehicle front-to-rear direction.

14. The vehicle air-conditioning system according to claim 10, wherein the air-flow direction change mechanism is configured such that when at least a part of the guide fin of the air-flow direction change mechanism contacts an inner wall of a flow passage, which forms the blow outlet, or a structure in the flow passage, the conditioning air is blown from the blow outlet toward the plate surface of the plate member.

15. A vehicle air-conditioning system for a vehicle, comprising:
a seat that is located in a vehicle cabin;
an air conditioner that is configured to generate conditioning air;
a blow outlet that is located at an instrument panel and is configured to blow the conditioning air, which is generated from the air conditioner, into the vehicle cabin;
an air-flow direction change mechanism that includes a guide fin configured to change a flow direction of the conditioning air, which is blown from the blow outlet, in a vertical direction;
a plate member that is installed at a vehicle cabin ceiling and is operable between:
a normal state where a plate surface of the plate member is placed along the vehicle cabin ceiling; and
a projecting state where the plate surface of the plate member projects into the vehicle cabin, wherein:
each of the guide fin of the air-flow direction change mechanism and the plate member is configured to enable an occupant to determine placement of each of the guide fin of the air-flow direction change mechanism and the plate member in a predetermined position of each of the guide fin of the air-flow direction change mechanism and the plate member with one of a visual sense, an auditory sense and a tactile sense of the occupant; and
the guide fin of the air-flow direction change mechanism and the plate member are configured such that in a state where a seat back of the seat is in a reclined state, and each of the guide fin of the air-flow direction change mechanism and the plate member is in the predetermined position of each of the guide fin of the air-flow direction change mechanism and the plate member, the conditioning air, which is blown from the blow outlet, collides to the plate surface of the plate member and thereafter reaches a specific part of the occupant who is on the seat having the seat back placed in the reclined state;
an actuator that is configured to drive one of the guide fin of the air-flow direction change mechanism and the plate member;
a seat back state sensing device that includes one of a sensor and a camera and is configured to sense a state of the seat back; and
a controller that is configured to control the actuator based on a sensed result of the seat back state sensing device, wherein:
when the reclined state of the seat back is sensed with the seat back state sensing device, the controller controls the actuator and thereby places the one of the guide fin of the air-flow direction change mechanism and the plate member in the predetermined position of the one of the guide fin of the air-flow direction change mechanism and the plate member, and
in a state where the one of the guide fin of the air-flow direction change mechanism and the plate member is placed in the predetermined position of the one of the guide fin of the air-flow direction change mechanism and the plate member, when another one of the guide fin of the air-flow direction change mechanism and the plate member is placed in the predetermined position of the another one of the guide fin of the air-flow direction change mechanism and the plate member, the conditioning air, which is blown from the blow outlet, collides to the plate surface of the plate member and thereafter reaches the specific part of the occupant who is on the seat having the seat back placed in the reclined state.

16. The vehicle air-conditioning system according to claim 15, wherein the plate surface of the plate member, to which the conditioning air blown from the blow outlet collides, is shaped in a curved form that is concavely curved in a vehicle front-to-rear direction.

17. The vehicle air-conditioning system according to claim 15, wherein the plate surface of the plate member, to which the conditioning air blown from the blow outlet collides, is shaped in a curved form that is concavely curved in a vehicle width direction.

18. The vehicle air-conditioning system according to claim 15, wherein the plate member is bendable or flexible at a middle of the plate member in a vehicle width direction or a middle of the plate member in a vehicle front-to-rear direction.

19. The vehicle air-conditioning system according to claim 15, wherein the air-flow direction change mechanism is configured such that when at least a part of the guide fin of the air-flow direction change mechanism contacts an inner wall of a flow passage, which forms the blow outlet, or a structure in the flow passage, the conditioning air is blown from the blow outlet toward the plate surface of the plate member.

20. A controller for air conditioning of a vehicle while the vehicle includes:
a seat that is located in a vehicle cabin;
an air conditioner that is configured to generate conditioning air;
a blow outlet that is located at an instrument panel and is configured to blow the conditioning air, which is generated from the air conditioner, into the vehicle cabin;
an air-flow direction change mechanism that includes a guide fin configured to change a flow direction of the conditioning air, which is blown from the blow outlet, in a vertical direction; and
a blow outlet drive actuator that is configured to drive the air-flow direction change mechanism; and
a seat back state sensing device that includes one of a sensor and a camera and is configured to sense a state of a seat back of the seat;
a plate member that is installed at a vehicle cabin ceiling and is operable between:
a normal state where a plate surface of the plate member is placed along the vehicle cabin ceiling; and
a projecting state where the plate surface of the plate member projects into the vehicle cabin; and
a plate member drive actuator that is configured to drive the plate member, wherein:
when a reclined state of the seat back is sensed with the seat back state sensing device, the controller controls;
the blow outlet drive actuator and thereby places the guide fin the air-flow direction change mechanism in a predetermined position of the guide fin of the at the air-flow direction change mechanism to direct the conditioning air, which is blown from the blow outlet, such that the conditioning air collides to the plate surface of the plate member, and
the plate member drive actuator places the plate member in a predetermined position of the plate member, so that the conditioning air, which collides to the plate surface of the plate member, reaches a specific part of an occupant who is on the seat having the seat back placed in the reclined state.

21. The controller according to claim 20, wherein when the reclined state of the seat back is sensed with the seat back state sensing device, the controller controls the air conditioner and thereby increases a flow rate of the conditioning air blown from the blow outlet in comparison to an upright state of the seat back.

* * * * *